United States Patent
Radel et al.

(10) Patent No.: US 10,123,405 B2
(45) Date of Patent: Nov. 6, 2018

(54) FAST BURST AND STEADY-STATE INTENSE NEUTRON SOURCE

(71) Applicant: PHOENIX LLC, Monona, WI (US)

(72) Inventors: Ross Radel, Madison, WI (US); Dave Schneider, Colorado Springs, CO (US); Eli Moll, Madison, WI (US); David Ozburn, Reston, VA (US); Evan Sengbusch, Verona, WI (US); Logan Campbell, Madison, WI (US)

(73) Assignee: PHOENIX LLC, Monona, WI (US)

( * ) Notice: Subject to any disclaimer, the term of this patent is extended or adjusted under 35 U.S.C. 154(b) by 0 days.

(21) Appl. No.: 15/125,855

(22) PCT Filed: Mar. 17, 2015

(86) PCT No.: PCT/US2015/021032
§ 371 (c)(1),
(2) Date: Sep. 13, 2016

(87) PCT Pub. No.: WO2015/199770
PCT Pub. Date: Dec. 30, 2015

(65) Prior Publication Data
US 2017/0018318 A1 Jan. 19, 2017

(51) Int. Cl.
*H05H 3/06* (2006.01)
*G21C 1/30* (2006.01)
(Continued)

(52) U.S. Cl.
CPC .............. *H05H 3/06* (2013.01); *G21C 1/30* (2013.01); *G21G 4/02* (2013.01); *H05H 1/06* (2013.01)

(58) Field of Classification Search
CPC ... G21C 1/30; G21G 1/00; G21G 4/02; H05H 3/06; G21B 1/01; G01V 5/0091
See application file for complete search history.

(56) References Cited

U.S. PATENT DOCUMENTS 2,969,313 A * 1/1961 Grebe ............... G21C 1/06
376/318
4,148,687 A * 4/1979 Chien ............... G21C 3/328
376/267
(Continued)

FOREIGN PATENT DOCUMENTS

EP 2485571 A1 8/2012
FR 2927761 A1 8/2009
(Continued)

OTHER PUBLICATIONS

Parma, E. et al., "Operational Aspects of an Externally Driven Neutron Multiplier Assembly Concept Using a Z-Pinch 14-MeV Neutron Source (ZEDNA)" Sandia Report SAND 2007-7307, Sep. 2007.*
(Continued)

*Primary Examiner* — Sharon M Davis
(74) *Attorney, Agent, or Firm* — Casimir Jones, S.C.; David Casimir

(57) ABSTRACT

A first system for producing a high flux of neutrons for non-destructive testing includes a dense plasma focus device neutronically coupled to a subcritical or sub-prompt critical fission assembly. The dense plasma focus device is a source of initiating neutrons for the fission assembly, and the fission assembly is configured to multiply a number of the initiating neutrons via inducing fission. A second system for producing a high flux of neutrons includes a gas-target neutron generator neutronically coupled to a subcritical or sub-prompt critical fission assembly. The gas-target neutron generator is a source of initiating neutrons for the fission assembly, and the fission assembly is configured to multiply a number of the initiating neutrons via inducing fission.

12 Claims, 21 Drawing Sheets

(51) Int. Cl.
G21G 4/02 (2006.01)
H05H 1/06 (2006.01)

(56) References Cited

U.S. PATENT DOCUMENTS

| | | | |
|---|---|---|---|
| 4,370,295 | A | 1/1983 | Bussard |
| 5,631,526 | A | 5/1997 | Ferry |
| 7,679,025 | B1* | 3/2010 | Krishnan ............... G21G 4/02 219/121.48 |
| 2008/0232533 | A1* | 9/2008 | Blanovsky ............. G21C 1/30 376/172 |
| 2008/0237499 | A1* | 10/2008 | Auchterlonie ......... H02J 4/00 250/503.1 |
| 2009/0316850 | A1* | 12/2009 | Langenbrunner ...... G21B 1/01 376/199 |
| 2010/0172458 | A1 | 7/2010 | Leung et al. |
| 2010/0215136 | A1* | 8/2010 | Rusnak ................. H05H 3/06 376/108 |
| 2010/0284502 | A1 | 11/2010 | Piefer |
| 2012/0328066 | A1 | 12/2012 | Burke et al. |
| 2013/0142296 | A1 | 6/2013 | Piefer |
| 2017/0018318 | A1 | 1/2017 | Radel et al. |
| 2017/0133114 | A1 | 5/2017 | Radel et al. |

FOREIGN PATENT DOCUMENTS

| | | |
|---|---|---|
| GB | 2305290 A | 4/1997 |
| WO | WO-03/091699 | 11/2003 |
| WO | WO 2008100269 A2 | 8/2008 |
| WO | WO 2011093938 A2 | 8/2011 |
| WO | WO 2015199770 A2 | 12/2015 |

OTHER PUBLICATIONS

International Search Report and Written Opinion for PCT Application No. PCT/US2015/021032, dated Jan. 22, 2016, 9 pages.
International Preliminary Report on Patentability Chapter I.
B. Freeman et al., Preliminary Neutron Scaling of the TAMU 460 kJ Plasma Focus (2002), Texas A&M University, Nuclear Engineering Department, TAMUS-3133, 3 pages.
Freiwald et al., A Survey of a 210-kj Dense Plasma Focus (DPF6), Los Alamos National Laboratory, 1974, 14 pages.
Hagen et al., Observed Multi-Decade DD and DT Z-Pinch Fusion Rate Scaling in 5 Dense Plasma Focus Fusion Machines, DOE/NV/25946-1807, 2013, 19 pages.
Lee et al., Research Results of Plasma Focus Numerical Experiments, Jul. 2008, 8 pages.
Lee, Introduction to the DPF-Machines, Applications and Properties, School and Training Course on Dense Magnetized Plasma as a Source of Ionizing Radiations, their Diagnostics and Applications, Oct. 2012, 77 pages.
M Milanese et al., A study of the production of neutrons in a dense plasma focus source operated with a non-uniform density of deuterium neutral gas., J.Phys. D: Appl. Physics. 31 (1998) pp. 85-92.
Meehan, Overview of NSTec Plasma Focus Tubes and Magnetohydrodynamic Modeling Capabilities, Feb. 2012, 11 pages.
Saw et al., Scaling Laws for Plasma Focus Machines from Numerical Experiments, Energy and Power Engineering, 2010, pp. 65-72.
EP Office Action dated Aug. 24, 2017, from related patent application EP15812124.4, pp. 1-4.
Zoita et al., A fusion-fission hybrid reactor driven by high-density pinch plasmas, Nukleonkia, vol. 46, No. Suppl. 1, 2001, 4 pages.
Koh et al., Optimization of the High Pressure Operation Regime for Enhanced Neutron Yield in a Plasma Focus Device, Plasma Sources Science and Technology, 2005, 7 pages.
EP Search Report dated Mar. 6, 2017, from related patent application EP15812124.4, pp. 1-6.
EP Search Report dated Jul. 31, 2017, from related patent application EP16194880.7, pp. 1-4.
EP Office Action dated Aug. 11, 2017, from related patent application EP16194880.7, pp. 1-5.
Sadowski et al., "Application of intense plasma-ion streams emitted from powerful PF-type discharges for material engineering" Physica Scripta 2006.T123 (2006): 66-78.

* cited by examiner

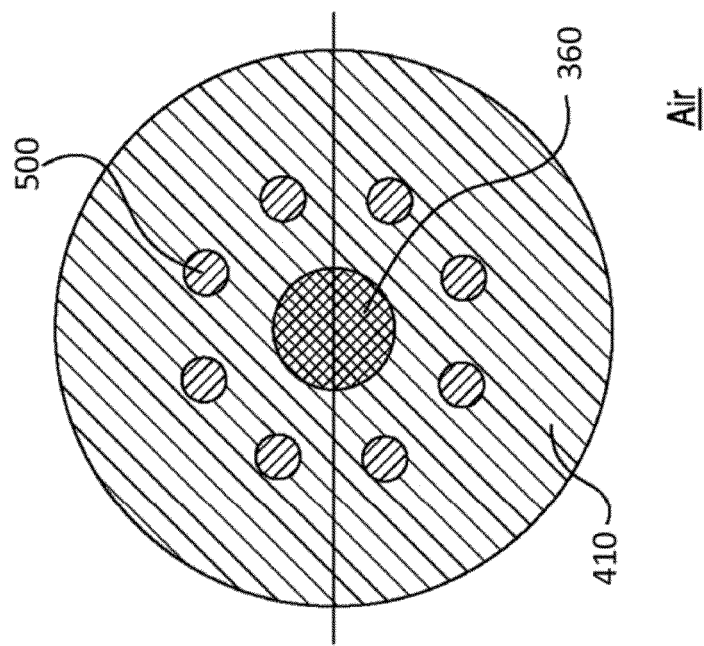

FAST BURST AND STEADY-STATE INTENSE NEUTRON SOURCE

CROSS REFERENCE TO RELATED APPLICATIONS

The present application is a National Stage of International Application No. PCT/US2015/021032, filed Mar. 17, 2015, which claims the benefit of U.S. Provisional Application No. 61/955,652 filed on Mar. 19, 2014, both of which are hereby incorporated by reference in their entireties.

FIELD

The present application relates generally to the field of neutron sources. More specifically, the present application relates to systems and methods for producing very high fluxes of neutrons with fast burst and steady-state intense neutron sources in compact devices.

BACKGROUND INFORMATION

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

For a variety of applications, it is desirable to produce very high fluxes of neutrons with fast burst and steady-state intense neutron sources. One such application is non-destructive testing. Non-destructive testing refers to an analysis technique used to evaluate the properties of a material, component or system without causing damage. Non-destructive testing may include radiation survivability testing. In order to carry out one form of non-destructive testing, it is desirable to produce very high fluxes of neutrons with compact devices. Other applications include but are not limited to neutron radiography, detection and/or evaluation of nuclear material (i.e., fission material), detection and/or evaluation of explosives, neutron diffraction, isotope production, materials irradiation (e.g. gemstone coloring), neutron activation analysis, coal assay, concrete assay, and ore assay.

A need exists for improved technology, including technology related to producing very high fluxes of neutrons fast burst and steady-state intense neutron sources in compact devices.

SUMMARY

An exemplary embodiment relates to a system for producing a high flux of neutrons includes a dense plasma focus device and a fission assembly neutronically coupled to the dense plasma focus device. The dense plasma focus device includes a cylindrical cathode; a cylindrical anode disposed within and concentric to the cathode; an insulator provided between portions of the cathode and the anode, the insulator disposed proximate to the input end of the dense plasma focus device; and a chamber bounded by the cathode and the anode, the chamber being pressurized with a fill gas. The fission assembly is a subcritical or a sub-prompt critical fission assembly. The dense plasma focus device is a source of initiating neutrons for the fission assembly, and the fission assembly is configured to multiply a number of the initiating neutrons via inducing fission.

Another embodiment relates to a system for producing a high flux of neutrons includes a gas-target neutron generator and a fission assembly neutronically coupled to the gas-target neutron generator. The gas-target neutron generator includes an ion source configured to produce an ion beam; an accelerator configured to accelerate the ion beam to produce an accelerated ion beam; a plurality of focus elements configured to focus the accelerated ion beam in an x-direction and a y-direction; and a pumping/gas-target section including a gas target chamber filled with a target gas. The fission assembly is a subcritical or a sub-prompt critical fission assembly. The fission assembly surrounds the gas target chamber. The gas-target neutron generator is a source of initiating neutrons for the fission assembly, and the fission assembly is configured to multiply a number of the initiating neutrons via inducing fission.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

FIG. 18 is a top view of a cross-section of the system of FIG. 17 in a region surrounded by the fuel.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology is for the purpose of description only and should not be regarded as limiting. An effort has been made to use the same or like reference numbers throughout the drawings to refer to the same or like parts.

System 1: Dense Plasma Focus Closely Coupled with a Fission Assembly

Referring generally to FIGS. 1-13, a system 1000 for producing very high fluxes of neutrons includes a Dense Plasma Focus (DPF) 100 neutronically coupled with a fission assembly 200. The fission assembly 200 may be either a subcritical fission assembly or a sub-prompt critical fission assembly. As used herein, the terms sub-prompt critical fission assembly and sub-prompt critical assembly are synonymous and interchangeable. The fusion neutrons produced by the DPF device 100 are emitted isotropically, or are forward peaked. In either case, the neutrons collide with anything around them. Therefore, the fission assembly 200, which is located proximate to the DPF device 100, is neutronically "coupled" to the DPF device 100 in that the DPF device 100 is the source of initiating neutrons.

Dense Plasma Focus

Figure 3:
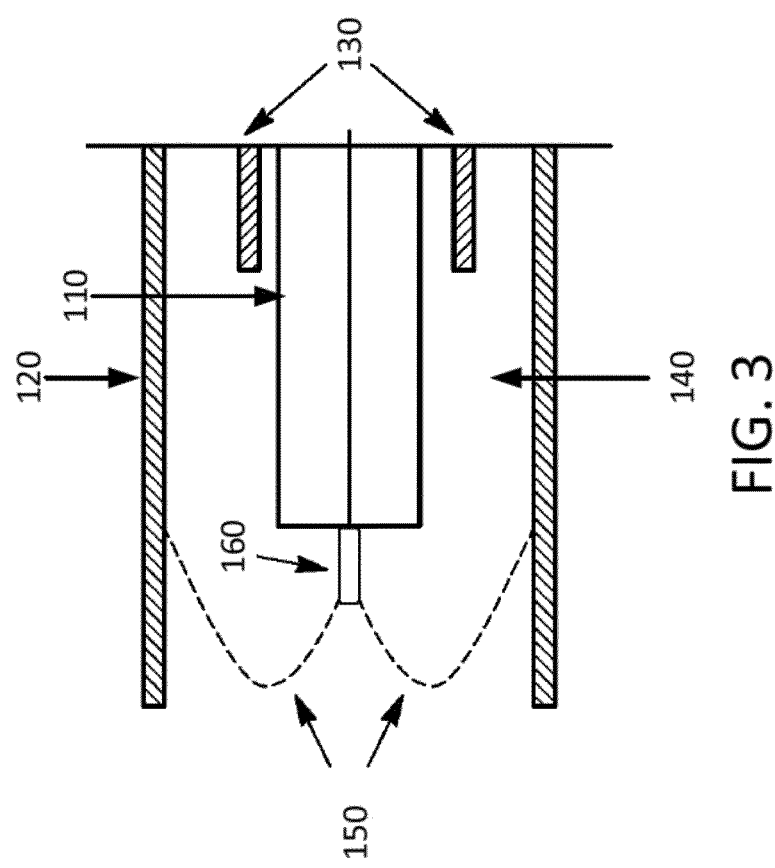
FIG. 3 illustrates an embodiment of the Dense Plasma Focus (DPF) of FIG. 1, according to a Simplified Mather Type Dense Plasma Focus design.

Referring to FIG. 3, one embodiment of the system 1000 includes a Mather-type DPF device 100 comprising an inner cylindrical anode 110 and an outer cylindrical cathode 120 with an insulator 130 separating them near a bottom, or input end, of the Mather-type DPF device 100. The insulator 130 assists in the generation of a current sheath 150 between the anode 110 and the cathode 120. A chamber 140 disposed between the anode 110 and the cathode 120 is pressurized with fill gas. In a conventional Mather-type DPF the fill gas is deuterium and has a pressure ranging from 1-25 Torr. However, in an illustrative embodiment of the DPF device 100 of the present application, the fill gas is a deuterium-tritium gas mixture (i.e., a DT gas mixture). For example, the fill gas may be an approximately 50/50 deuterium-tritium gas mixture. Several tests have demonstrated that using the DT gas mixture results in an increased in neutron production of nearly two orders of magnitude.

Figure 4:
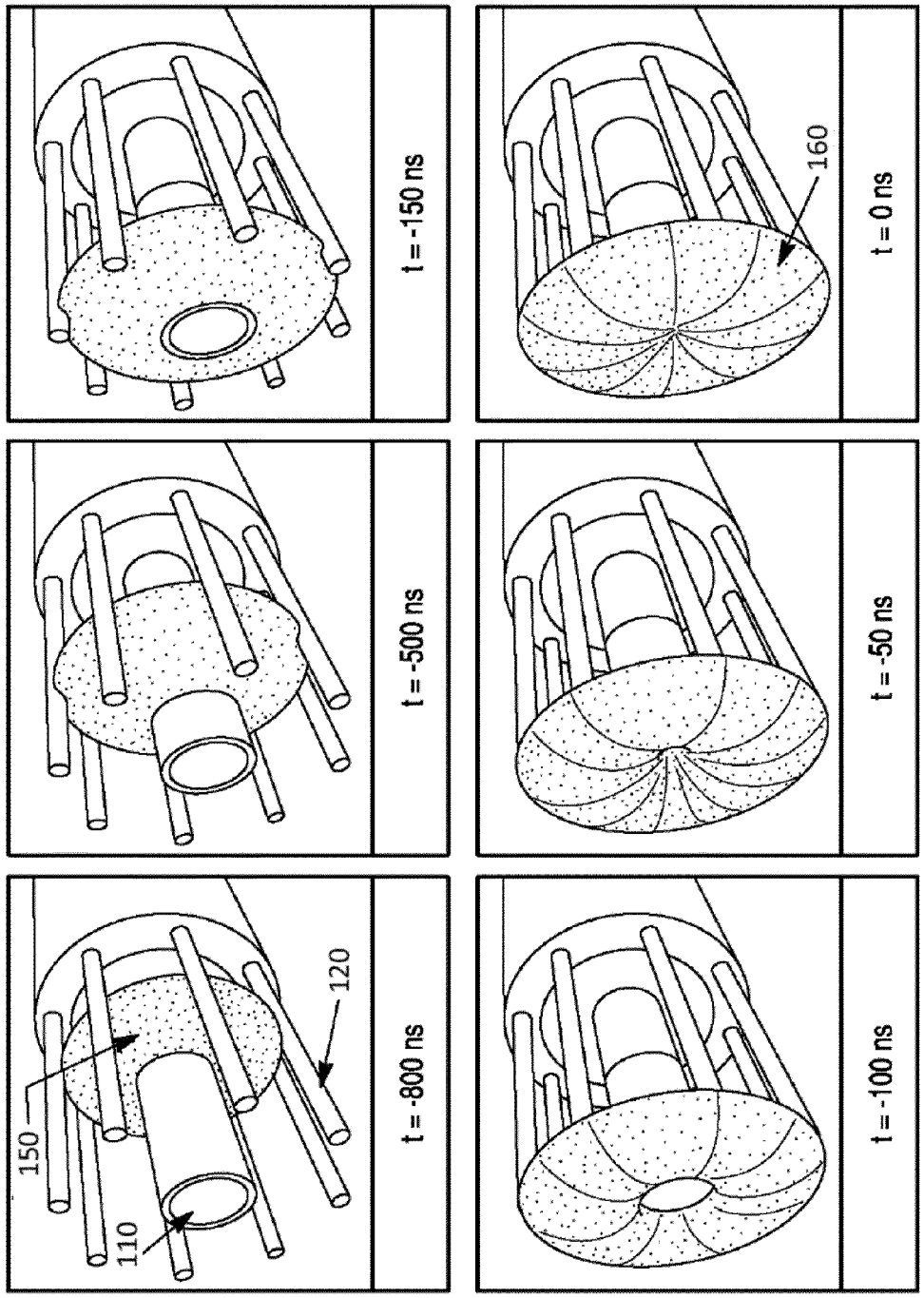
FIG. 4 illustrates a generation of a current sheath, transportation of the sheath down an anode, and a resulting radial pinch after compression in the Dense Plasma Focus (DPF) of FIG. 3.

The DPF device 100 is a device that produces a short-lived plasma by electromagnetic acceleration and compression. In particular, once the pulsed energy is delivered to the DPF device 100, a current sheath (i.e., a plasma sheath) 150 will form between the anode 110 and the cathode 120. As used herein, a current sheath and a plasma sheath are synonymous and interchangeable. This current sheath 150 will then travel axially until it reaches the end of the anode 110, whereupon it will be swept inward causing thermonuclear fusion in a pinch 160 at the center of a tip of the anode 110. Throughout this process, the current sheath 150 sweeps up a fraction of the fill gas that it encounters. The radial pinch 160 compresses the fill gas swept up by the current sheath 150. The radial pinch 160 is where thermonuclear fusion occurs, and thus, where neutrons are generated. FIG. 4 illustrates the generation of the current sheath 150, transportation of the current sheath 150 down the anode 110, and the resulting radial pinch 160 after electromagnetic compression.

The DPF device 100 is a geometrically simple device. Yet even in its simplicity there exist a great number of parameters which impact its stability and performance. These parameters can be sorted into two categories: 1) those parameters regarding the DPF device illustrated in FIG. 1, and 2) the parameters regarding a capacitor bank system that delivers the required energy to the DPF. These parameters will be discussed in further detail below.

DPF Neutron Yield

In order to ensure that the chosen parameters are capable of producing the appropriate neutron yields, the problem was approached on two fronts. First, the DPF was modeled using the RADPFV.15 simulation developed by Sing Lee. See S. Lee. "Theory of Radiative Plasma Focus Model—S Lee Model," 2005, the entire contents of which are incorporated herein by reference. Second, the parameters chosen for the simulation were selected by studying existing devices and relevant literature. This ensured that the neutron yield could be improved, while maintaining the fidelity that the selected parameters were supported by operational experience with Mather-type DPFs.

The RADPFV.15 simulation was chosen due to its proven success in modeling the observable performance in current DPF designs, as well as the accurate prediction of the neutron yield. For example, Lee's model has been verified through experimental data from existing DPF devices such as the PF400, UNU/ICTP PFF, NX2, Poseidon, and PF1000. See S. Lee, S. H. Saw. "Research Results of Plasma Focus Numerical Experiments," *IWPCA*2008, July 2008, the entire contents of which are incorporated herein by reference. In all of these cases the plasma current and behavior calculated in the simulation accurately fit the experimental plasma data, and of equal importance, the experiment neutron yield data was accurately predicted. Further, the RADPFV.15 simulation accurately simulated the relationships between energy, current, and neutron yield in the various scaling regimes. See S. H. Saw, S. Lee. "Scaling Laws for Plasma Focus Machines from Numerical Experiments," *Energy and Power Engineering*, 2010, pp 65-72, the entire contents of which are incorporated herein by reference. Aside from being thoroughly tested, the RADPFV.15 simulation allows for control over the governing characteristics of the DPF geometry, the fill gas composition and pressure, and the capacitor bank system. With control over such a wide variety of parameters, studies were conducted to better understand the interdependencies in the DPF to improve the neutron yield of the system.

Figure 5:
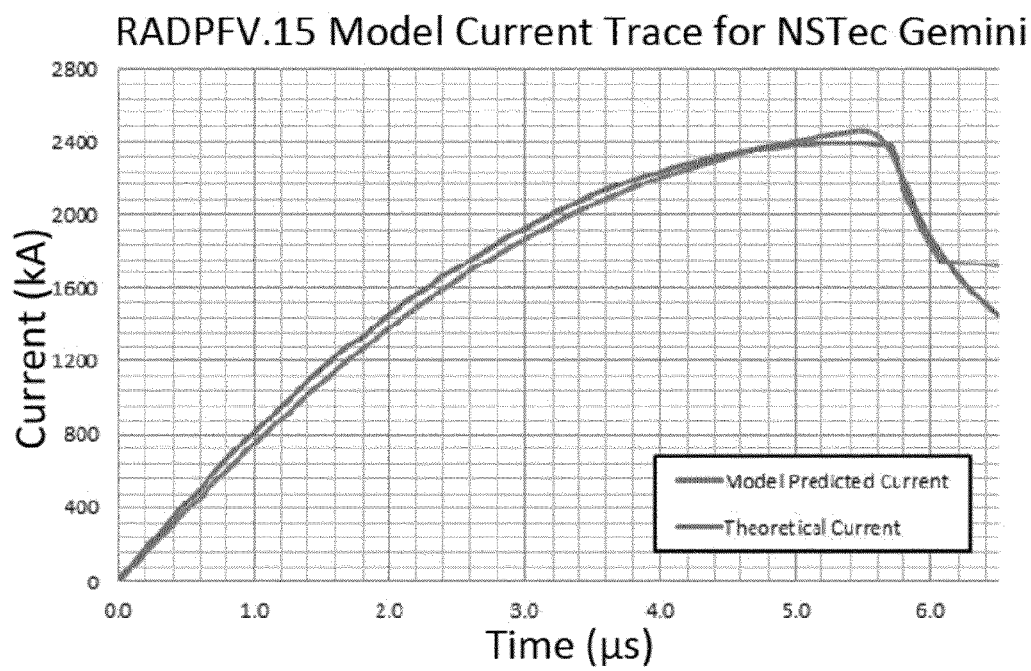
FIG. 5 is a graph illustrating a theoretical current trace from an NSTec Gemini Model Calibration along with a current trace predicted by the model.

In order to utilize the RADPFV.15 simulation (i.e., the RADPFV.15 model), the model was first calibrated using an existing current trace from a known DPF device. In this experiment, for example, a Gemini DPF device developed by NSTec was used for the calibration, although a different DPF device may have been utilized. The Gemini DPF was selected because it has been known to consistently produce a $1 \times 10^{12}$ n/pulse while utilizing deuterium-deuterium (DD) fill gas. One of ordinary skill in the art will appreciate that a DPF with a DD fill gas is accurate for calibrating a model that will be used to simulate a DPF with a 50/50 DT gas mixture fill gas because the cross sections of the two fusion reactions are well known, and comparison experiments involving DPFs have been conducted in the field. The input parameters for the Gemini DPF device, as well as the theoretical current trace were retrieved from recent NSTec presentations, as well as personal communication with Dr. Daniel Lowe of NSTec. See T. Meehan. "Overview of NSTec Plasma Focus Tubes and Magnetohydrodynamic Modeling Capabilities," February 2012 and E. C. Hagen, D. Lowe, R. Obrien, S. Molnar, B. T. Meehan, "Observed Multi-Decade DD and DT Z-Pinch Fusion Rate Scaling in 5 Dense Plasma Focus Fusion Machines," DOE/NV/25946-1807, 2013, the entire contents of which are incorporated herein by reference. The fitting parameters were adjusted until the model was correctly calibrated to the Gemini DPF device. FIG. 5 shows the theoretical current trace from NSTec along with the current trace predicted by the model. It can be seen that throughout the axial translation and radial pinch, the two current traces match very well, and as such the model was calibrated to accurately predict the pulse timing and peak current delivered i.e., the neutron yield from the Gemini DPF device.

After successfully calibrating the model for the Gemini DPF device, a simulation could be run using parameters associated with a typical DD pulse. The model was run to simulate the device firing at standard operating parameters, for example, a capacitor bank energy of 600 kJ rather than the maximum possible energy of 1 MJ, as there is very little data for the maximum energy case. See E. C. Hagen, D. Lowe, R. Obrien, S. Molnar, B. T. Meehan, "Observed Multi-Decade DD and DT Z-Pinch Fusion Rate Scaling in 5 Dense Plasma Focus Fusion Machines," DOE/NV/25946-1807, 2013. Table 1 contains the relevant NSTec input parameters for the RADPFV.15 model.

TABLE 1

| Parameter | Value |
| --- | --- |
| Anode Radius (cm) | 7.62 |
| Cathode Radius (cm) | 10.16 |
| Anode Length (cm) | 38.1 |
| Fill Gas Pressure (Torr) | 10 |
| Charging Voltage (kV) | 52.7 |
| Net Bank Capacitance (µF) | 432 |
| Nominal Inductance (nH) | 67 |
| Characteristic Resistance (mΩ) | 4.0 |
| Bank Energy (kJ) | 600 |

The RADPFV.15 model predicted a yield of $9.76 \times 10^{11}$ n/pulse, while the experimental data displayed a typical neutron yield of approximately $1 \times 10^{12}$ n/pulse. See T. Meehan. "Overview of NSTec Plasma Focus Tubes and Magnetohydrodynamic Modeling Capabilities," February 2012. This verified that the RADPFV.15 simulation was able to accurately predict the neutron yield of devices that were not included in its original calibrations. Based on this success, the RADPFV.15 was deemed an appropriate model for the development of the DPF device 100 of the present application. Further, the fitting parameters for the DPF device 100 of the present application were more conservative than those used for the Gemini DPF device, to ensure that the neutron yield estimate would be adequate in the event that the actual fitting parameters would be lower. With the conservative fitting parameters, the Gemini DPF device has a predicted yield of a $7.80 \times 10^{11}$ n/pulse, allowing for a ~20% margin of safety in the selection of fitting parameters.

As seen from Table 1, various parameters exist within the DPF device that can be modified. As the DPF device 100 of the present application preferably has a yield of at least $1 \times 10^{14}$ neutrons per shot, maintaining the integrity of the neutron yield was of utmost importance as each parameter was modified in the simulation. The parameters for the DPF device 100 of the present application are displayed in Table 2.

TABLE 2

| Parameter | Value |
| --- | --- |
| Anode Radius (cm) | 25 |
| Cathode Radius (cm) | 30 |
| Anode Length (cm) | 50 |
| Fill Gas Pressure (Torr) | 20 |
| Charging Voltage (kV) | 49.5 |
| Net Bank Capacitance (mF) | 2.45 |
| Nominal Inductance (nH) | 600 |
| Characteristic Resistance (mΩ) | 3.08 |
| Bank Energy (MJ) | 3.00 |

A comparison of Tables 1 and 2 indicates the Gemini DPF device and the DPF device 100 of the present application differ in many respects. For example, in the DPF device 100 of the present application, the anode has a radius of at least 20 cm, and the cathode has a radius of at least 30 cm. However, any suitable sized radiuses may be utilized.

First, the physical size of the DPF device 100 of the present application is much larger than the Gemini DPF device. With electrode radii approximately three times larger in the DPF device 100 of the present application, one might question the feasibility of constructing such a large DPF.

However, the physical size of the DPF device 100 of the present application is on the same order as the PF-1000 DPF device, which is a 1 MJ DPF currently operating in Warsaw, Poland with an anode radius of 11.6 cm, a cathode radius of 20 cm, and an anode length of 56 cm. See S. Lee. "Introduction to the DPF—Machines, Applications and Properties," in *School and Training Course on Dense Magnetized Plasma as a Source of Ionizing Radiations, their Diagnostics and Applications*, October 2012, the entire contents of which are incorporated herein by reference. One of ordinary skill in the art will appreciate that there is a general trend among DPF devices, which also is supported in the numerical model, that as the device size increases, the amount of material swept into the pinch is also increased, and the resulting neutron yield is greater.

Second, the DPF device 100 of the present application has a typical capacitor bank energy that is a factor of five larger than that of the Gemini DPF device. Knowing that in the high energy regime the scaling of neutron yield follows the relation of $Y_n \sim E^{0.8}$ $Y_n \sim E^{0.8}$, this implies that the DPF device 100 of the present application may increase neutron yield by a factor of ~3.6. Along with this, the peak current for both the Gemini DPF and the DPF device 100 of the present application is roughly 2.4 MA, locating them below the threshold of 3 MA where neutron yields drop off. In order to improve neutron yield in the DPF device 100 of the present application, the peak current was limited by increasing the inductance, which accounts for the difference in inductance between the Gemini DPF device and the DPF device 100 of the present application. Further, the operating voltages for both the Gemini DPF device and the DPF device 100 of the present application are very similar, and it is unlikely that operating voltage would be a significant design concern. Although the capacitance of the Gemini DPF device and the DPF device 100 of the present application looks rather different, they differ mostly in configuration. The Gemini DPF device includes two capacitor banks constructed in parallel, whereas the DPF device 100 of the present application includes a single capacitor bank or a group of capacitor banks constructed in series.

The final gain that can be expected when comparing the Gemini DPF device and the DPF device 100 of the present application is to compare the fill gas composition and pressure. Although there is debate as to the magnitude of increase, there is agreement that switching from DD filling gas to a DT mix increases the neutron yield by over a factor of ~50. Moreover, several DPF devices have been designed to operate in a high pressure regime to investigate the impact on neutron yield. Not only have DPF devices been built that can operate with high sheath integrity in fill gas pressures above 15 Torr, but many have also reported an increase in neutron production. See D. A. Freiwald, J. N. Downing. "A Survey of a 210-kJ Dense Plasma Focus (DPF 6)," at *Los Alamos National Laboratory*, 1974; B. Freeman, J. Boydston, J. Ferguson, T. Guy, B. Lindeburg, A. Luginbill, J. Rock. "Preliminary Neutron Scaling of the TAMU 460 kJ Plasma Focus," in *Pulsed Power Plasma Science*, 2001, pp 682-684; and J. M. Koh, R. S. Rawat, A. Patran, T. Zhang, D. Wong, S. V. Springham, T. L. Tan, S. Lee, P. Lee. "Optimization of the High Pressure Operation Regime for Enhanced Neutron Yield in a Plasma Focus Device," in *Plasma Sources Science and Technology*, 2005, pp 12-18, the entire contents of which are incorporated herein by reference.

By analyzing the DPF device 100 of the present application with respect to the Gemini DPF device, there is evidence supporting the assertion that the DPF device 100 of the present application will yield a at least a $1 \times 10^{14}$ n/pulse. For example, the DPF device 100 may yield a $3.71 \times 10^{15}$ n/pulse. By increasing the physical size, both history and numerical models suggest that there will be an increase in neutron yield. Further, by depositing more energy in the pinch, while keeping the peak current below the threshold, well established scaling factors suggest an increase in neutron yield by as much as a factor of ~3.6. Finally, switching to a fill gas consisting of a DT mixture will increase the neutron yield by at least a factor of 50, and the increase in fill gas pressure is projected to increase the yield even more.

While there is significant information from the RADPFV.15 simulation to support the claim that the DPF device 100 of the present application can generate a $3.71 \times 10^{15}$ n/pulse, the following discussion is included regarding several different options that could be pursued in the event that the yield or stability of the DPF device 100 of the present application is questionable after construction.

The integrity of the current sheath in a DPF device is highly sensitive to the fill gas pressure. To one of ordinary skill in the art, the fill gas pressure of 20 Torr in Table 2 may appear high or unreasonable. However, literature reviews have shown that there have been a handful of DPF devices that operate within the high fill-gas-pressure regime of greater than 15 Torr. These consist of the LANL DPF 6 (see D. A. Freiwald, J. N. Downing. "A Survey of a 210-kJ Dense Plasma Focus (DPF 6)," at *Los Alamos National Laboratory*, 1974), the TAMU DPF (see B. Freeman, J. Boydston, J. Ferguson, T. Guy, B. Lindeburg, A. Luginbill, J. Rock. "Preliminary Neutron Scaling of the TAMU 460 kJ Plasma Focus," in *Pulsed Power Plasma Science*, 2001, pp 682-684), and tests done on the NX2 DPF (see J. M. Koh, R. S. Rawat, A. Patran, T. Zhang, D. Wong, S. V. Springham, T. L. Tan, S. Lee, P. Lee. "Optimization of the High Pressure Operation Regime for Enhanced Neutron Yield in a Plasma Focus Device," in *Plasma Sources Science and Technology*, 2005, pp 12-18). The tests done on the NX2 DPF are the most enlightening, as they explore the neutron yield as a function of the deuterium fill gas pressure. By varying the pressure over the range of 0-36 mbar, the results showed a maximum neutron yield achieved at a fill pressure of 20 mbar (~15 Torr). See J. M. Koh, R. S. Rawat, A. Patran, T. Zhang, D. Wong, S. V. Springham, T. L. Tan, S. Lee, P. Lee. "Optimization of the High Pressure Operation Regime for Enhanced Neutron Yield in a Plasma Focus Device," in *Plasma Sources Science and Technology*, 2005, pp 12-18. The results from the LANL DPF 6 also suggest that operating in the high pressure regime increases the neutron yield of the device. See D. A. Freiwald, J. N. Downing. "A Survey of a 210-kJ Dense Plasma Focus (DPF 6)," at *Los Alamos National Laboratory*, 1974. Yet, most existing DPF devices still operate in a low pressure regime, and as such, the neutron yields of these DPF devices likely suffer. From these results it can be observed that it is possible to create a DPF device that operates in the high pressure regime, and that doing so will likely increase the neutron yield. Note that this data agrees with the results from the RADPFV.15 simulations indicating that higher fill gas pressures (up to 20 Torr) lead to higher neutron yields.

Figure 6:
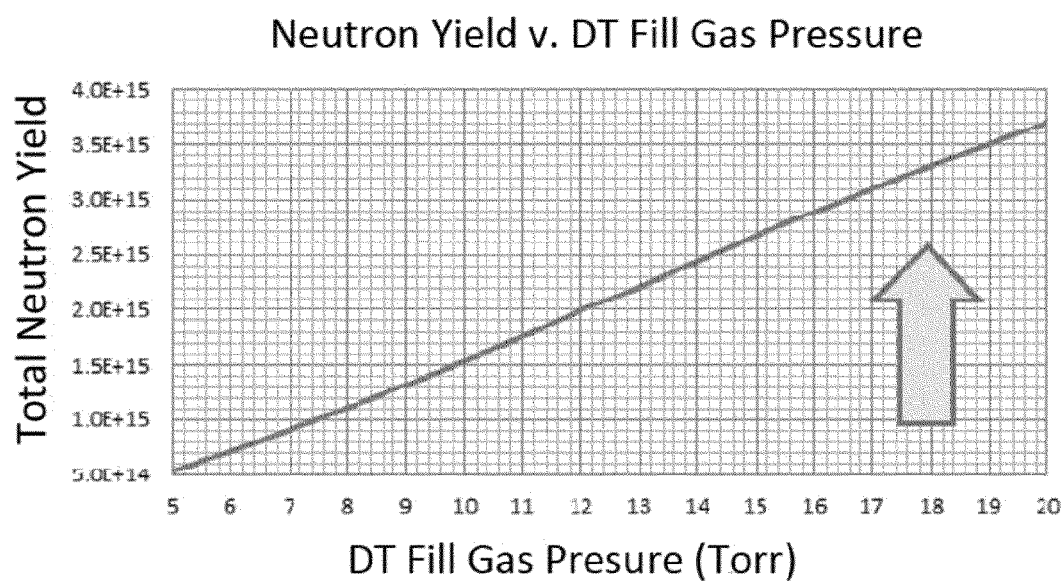
FIG. 6 is a graph illustration the neutron yield of the device at the proposed operational parameters while varying the fill gas pressure.

While one may choose to operate in a high pressure regime for the neutron yield benefits, there are possible drawbacks. Plasma instabilities can develop in the current sheath 150 when operating in the high pressure regime. With this in mind the, DPF device 100 of the present application was designed such that it could maintain acceptable neutron yields with the same operational parameters if the fill gas pressure was reduced. FIG. 6 displays the projected neutron yield of the DPF device 100 of the present application at the proposed operational parameters while varying the fill gas pressure. The pressure of the fill gas may be 1-100 Torr. It can be seen that at a pressure of 20 Torr the DPF device 100 of the present application is projected to yield a $3.71 \times 10^{15}$ n/pulse, while at 10 Torr the DPF device 100 of the present application is projected to yield a $1.51 \times 10^{15}$ n/pulse. Further, the DPF device 100 of the present application continues to produce greater than a $1 \times 10^{14}$ n/pulse at pressures as low as 7.5 Torr, which is a pressure at or near that of which many reported DPF devices have operated reliably and without reported plasma instabilities. This ensures that the DPF device 100 of the present application will not only outperform the requirements at high pressures, but that in the event of instabilities the DPF device 100 of the present application can be easily modified to gain reliability without sacrificing the fidelity of the neutron yield.

In another embodiment, the DPF device 100 of the present application may operate in the low pressure regime while utilizing well timed gas puffs, or released gas clouds, to locally raise the fill gas pressure at the pinch. This has been done in a number of experiments, but was tested thoroughly as both a free gas cloud and a constant gas jet in a study conducted at the Instituto de Fisica Arroyo Seco at the Universidad Nacional del Centro in Argentina. See M. Milanese, R. Moroso, J. Pouzo, "A Study of the Production of Neutrons in a Dense Plasma Focus Source Operated with a Non-Uniform Density of Deuterium Neutron Gas," *Journal of Physics D: Applied Physics*, Volume 31, May 1997, pp 85-92, the entire contents of which are incorporated herein by reference. By raising the fill gas pressure locally at the point of compression, it has been shown that the neutron yield can actually exceed the results found from using a higher static pressure by over a factor of three. This is due to the fact that a high static pressure, while increasing the relative neutron yield in the radial compression, can have adverse effects on the velocity and stability of the current sheath. Therefore, the ability to maintain low pressure in the chamber creates a stable current sheath with high axial velocity, while the local addition of fill gas at the pinch enhances the neutron yield.

Figure 7:
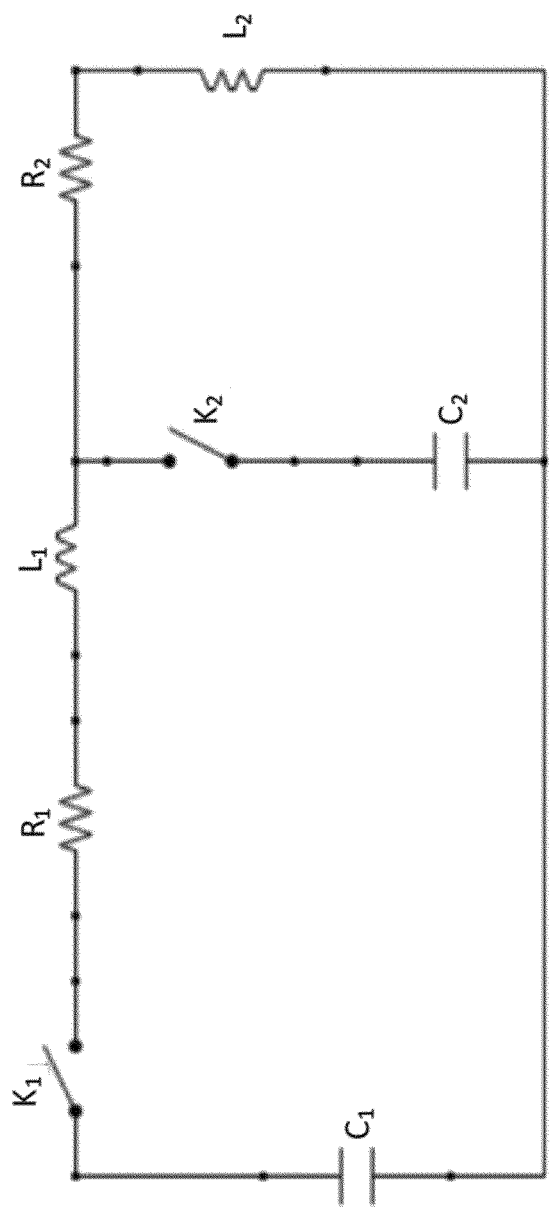
FIG. 7 is a schematic illustration of a circuit design for a two-stage capacitor bank system for the Dense Plasma Focus (DPF) of FIG. 3.

While the RADPFV.15 model can only simulate the effect of a single capacitor bank discharge, studies have suggested that precise control over the capacitor bank system can drastically enhance neutron yields. This control takes the form of designing a system with a faster current rise time, increased drive voltage, and increased pinch current. By designing a system consisting of multiple capacitor banks, the individual capacitor bank discharges can be timed such that a specific pulse is formed. This can allow for a much faster current drive time and a larger current delivered during the radial pinch. Referring to FIG. 7, in one embodiment, a circuit design for the system of multiple capacitor banks includes a primary capacitor bank $C_1$, a primary spark-gap switch $K_1$, an in-line resistance $R_1$, a main line inductance $L_1$, a secondary capacitor bank $C_2$, and a secondary spark-gap switch $K_2$. $R_2$ and $L_2$ are time-dependent quantities which represent the DPF load. Note that the secondary capacitor bank $C_2$ would fire a few μs after the primary capacitor bank $C_1$ in order to coincide with the beginning of the radial compression phase. Such timing ensures that as the radial compression is forming the pinch, it is also coinciding with a burst of high, fast-rising current. This will increase the pinch current, and subsequently increase the neutron yield in accordance to the scaling law of $Y_n \sim I_{pinch}^{4.6}$, as discussed by Lee. See S. H. Saw, S. Lee. "Scaling Laws for Plasma Focus Machines from Numerical Experiments," *Energy and Power Engineering*, 2010, pp 65-72. While multiple capacitor bank systems cannot be simulated using the numerical model (i.e., the RADPFV.15 model), it is assumed that the proposed scaling would uphold and pinch current enhancements would increase the currently predicted maximum yield. Since the phenomenon of multiple capacitor bank systems cannot be captured in the existing RADPFV.15 model, the implications were not used to increase the conservative estimate of the maximum neutron yield of a $3.71 \times 10^{15}$ n/pulse.

From numerical simulations in RADPFV.15 with the parameters listed in Table 2, the DPF device 100 of the present application is projected to have a neutron yield of a $3.71 \times 10^{15}$ n/pulse at 20 Torr, while still producing a $1 \times 10^{15}$ n/pulse at pressures as low as 7.5 Torr. Further, comparison with current and past DPF designs verifies two important facts. First, not every DPF design is operating in a manner which improves the neutron yield. There are many DPF devices operating at too low of a gas fill pressure, too low of a capacitor bank energy, or with relatively poor current delivery timing from their capacitor banks Such issues could cause significant losses in neutron yields and account for the disparity between the expected and observed results in many recorded DPF devices. Second, the parameters selected for the DPF device 100 of the present application are all represented in or near the operational experience of Mather type DPF devices. By selecting values for the parameters that maximize the neutron yield and remain within the wide range of operational experience, it is expected that neutron yields in excess of a $1 \times 10^{15}$ n/pulse are attainable with current technology and the DPF design of the present application. Therefore, the DPF device 100 of the present application is a suitable, simple, inexpensive, and reliable driver to be used in conjunction with an SPCA for various applications, for example, non-destructive testing.

Fission Assembly

The fission assembly 200 may be a subcritical fission assembly or a sub-prompt critical fission assembly.

In a subcritical fission assembly, $k_{eff}$ is less than 1. Therefore, if external neutrons are injected into the system, they will be multiplied by the subcritical fission assembly such that more neutrons are produced. However, the subcritical fission assembly neutrons are not self-sustaining. If the external neutron source (i.e., the DPF device 100) is removed, the subcritical fission assembly will stop producing neutrons almost instantaneously. For steady-state applications, it is beneficial to use a subcritical fission assembly as opposed to a sub-prompt critical assembly, to prevent the system from oscillating between high and low values of $k_{eff}$, and/or to prevent the system from settling down to a $k_{eff}$ value that might be critical.

An assembly is prompt critical if for each nuclear fission event, the prompt neutrons released from a nuclear fission event cause an additional nuclear fission event. In other words, the effective neutron multiplication factor $k_{eff}$ equals one, and the chain reaction is self-sustaining. The sub-prompt critical fission assembly has a $k_{eff}$ greater than 1, but less than the sub-prompt critical value for that system. Although the specific sub-prompt critical value is different for every system, it is generally around 1.008. If external neutrons are sent into this system, and the system was perfectly cooled, the amount of new neutrons produced would continue growing. If the external source was removed, the neutrons would continue to be produced. However, in actual practice, the heat generated from the fissions occurring cause the $k_{eff}$ of the system to drop below 1. This is ideal for a pulsed source of neutrons because the system can have a higher $k_{eff}$ (for example, 1.005), which results the neutron multiplication being relatively high. However, the system is also safe because the pulse will be automatically shut off if the external source of neutrons is removed.

An analytical model derived from the neutron kinetics equations was used to predict the time-dependent response of the fission assembly 200 to the DPF pulse projected for the DPF device 100 of the present application. The fusion neutrons produced by the DPF device 100 are emitted isotropically, or are forward peaked. In either case, the neutrons collide with anything around them. Therefore, the fission assembly 200, which is located proximate to the DPF device 100, is neutronically "coupled" to the DPF device 100 in that the DPF device 100 is the source of initiating neutrons. The fission assembly 200 will maintain a certain $k_{eff}$ with or without the presence of first order external neutrons if the temperature is constant. For a $k_{eff}$ around 1, the fissile material "multiplies" the fusion source neutrons (i.e., neutrons from the DPF device 100) via inducing fissions and creating more neutrons. Thus, the fission assembly 200 is neutronically coupled to the DPF device 100.

Figure 8:
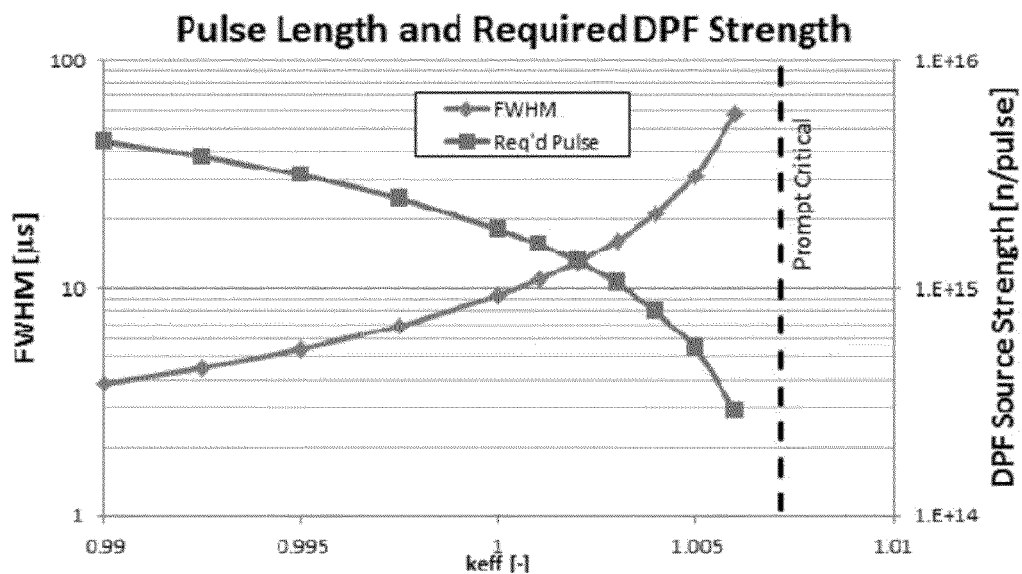
FIG. 8 is a graph illustrating pulse length and required Dense Plasma Focus DPF driver strength for various values of $k_{eff}$.

The results of the calculations for the pulse yield against various values of $k_{eff}$ in the Phoenix Nuclear Labs sub-prompt critical fission assembly (SPCA) 200 are plotted in FIG. 8. It was observed that pulse width for the DPF/SPCA system 1000 is dependent on the reactivity and the neutron lifetime inherent to the system. Pulse size is dependent on reactivity, initial number of neutrons, and their effectiveness (which is driven by geometry and material selection). By "dialing in" the $k_{eff}$ value for the DPF/SPCA system 1000, different neutron fluence can be delivered for constant DPF source strength. In addition, the DPF neutron pulse fluence can be changed easily by modifying the charge voltage on the capacitor bank.

Figure 9:
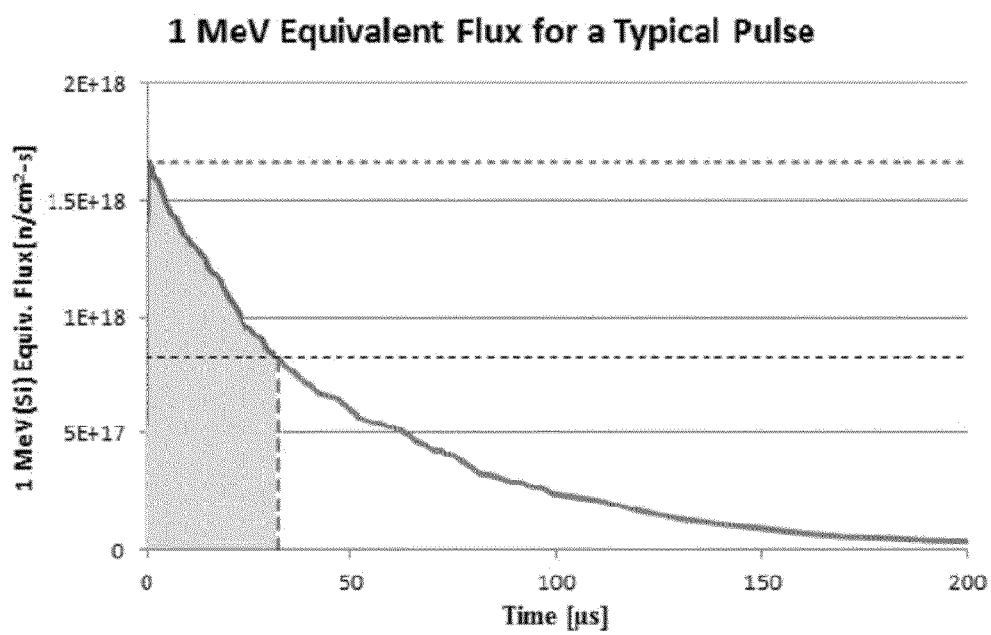
FIG. 9 is a graph illustrating time dependence of the neutron flux (1 MeV Si Equivalent) and a corresponding full width at half maximum (FWHM) calculation.

More detailed analyses were performed on this system using the Monte Carlo N-Particle (MCNP) simulation developed at Los Alamos National Laboratory (LANL). See X-5 Monte Carlo Team, 2003. MCNP—*A General Monte Carlo N-Particle Transport Code, Version 5, Volume I: Overview and Theory*, LA-UR-03-1987, Los Alamos National Lab, the entire contents of which are incorporated herein by reference. The MCNP Code, developed and maintained by Los Alamos National Laboratory, is the internationally recognized code for analyzing the transport of neutrons and gamma rays by the Monte Carlo method. The code deals with transport of neutrons, gamma rays, and coupled transport (transport of secondary gamma rays resulting from neutron interactions). The use of MCNP allowed for precise tracking of different types of radiation and their interactions within the designed system, allowing for a determination of both safety and performance parameters. Due to the unique pulse shape of the DPF/SPCA system 1000, it is difficult to compare pulse statistics between the DPF/SPCA system 1000 of the present application and the current Fast Burst Reactor (FBR) at White Sands Missile Range (WSMR). In general, a DPF device delivers the neutrons in a very short period of time, for example, about 50 ns. In the desired time scale of tens of microseconds, this is virtually instantaneous and the rise time is effectively zero. The pulse decays with a predictable exponential behavior that is dependent on parameters of the multiplier system. There is not a standard convention for determining the pulse length of the exponential decay shape. Similar devices, such as ZEDNA, have also encountered the problem of comparing the exponential decay pulse to the Gaussian pulse. See Parma, E. J. et al. "*Operational Aspects of an Externally Driven Neutron Multiplier Assembly Concept Using a Z-Pinch* 14-*MeV Neutron Source (ZEDNA).*" SAND2007-7307, Sandia National Lab., 2007, the entire contents of which are incorporated herein by reference. The length of Gaussian-shaped reactor pulses are often measured using the full width at half maximum (FWHM). In an attempt to present a fair comparison, the same technique was applied to the DPF driven pulse of the present application. Because of the negligible rise time, the FWHM is the time elapsed between the peak of the pulse and the half height of the pulse. FIG. 9 illustrates the time dependence of the flux in the SPCA cavity and the derived FWHM. Based on the exponential decay shape, only 50% of the fluence is delivered within the FWHM. This is significantly lower than the Gaussian shape pulse, which delivers about 75% of the fluence during the FWHM.

With a known desire to irradiate larger objects, a strong emphasis was placed on expanding the cavity diameter. Initially the inner diameter of the cavity was increased to 30 cm. Results from the MCNP model showed that the fluence was not significantly reduced compared to the 17 cm design. The cavity diameter was then further increased to 50 cm and the fluence was minimally affected. The larger diameter cavity systems are nearly identical from a performance perspective, but they are also more expensive. The thickness of fuel surrounding the test cavity is rather similar for the three designs. Having a larger cavity increases the total amount of low enriched uranium (LEU) in the system, and thus, proportionately drives up the cost.

Figure 1:
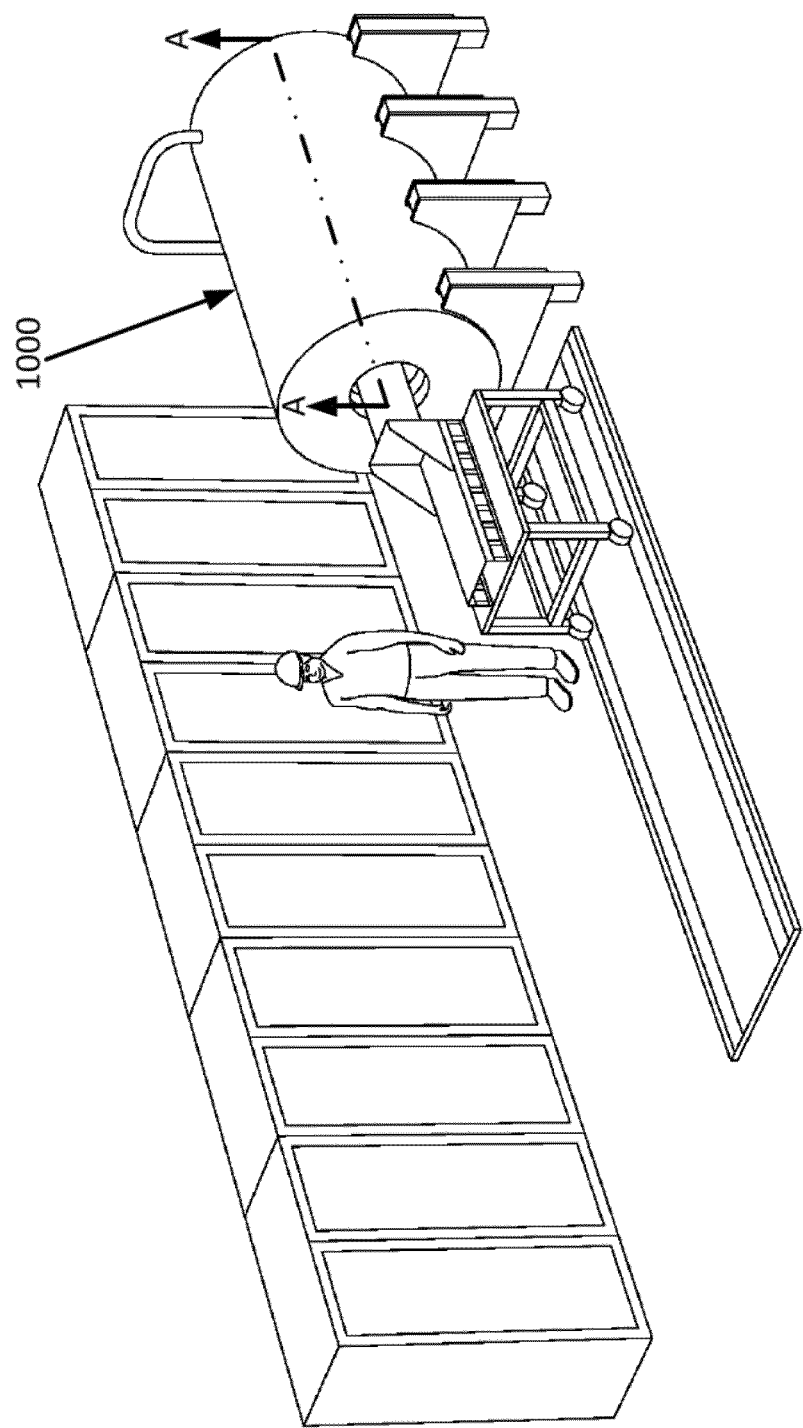
FIG. 1 illustrates an embodiment of a system for producing a high flux of neutrons that includes a Dense Plasma Focus (DPF) neutronically coupled to a subcritical or a sub-prompt critical fission assembly.
Figure 2:
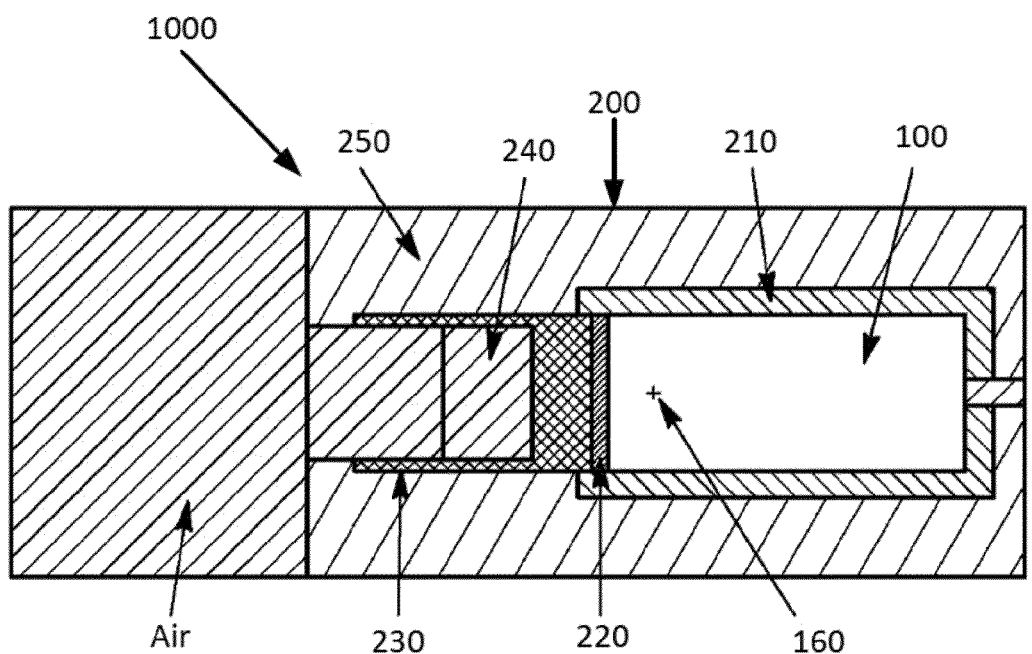
FIG. 2 is a cross-sectional view of the Dense Plasma Focus (DPF) and the subcritical or the sub-prompt critical fission assembly of FIG. 1 through the line B-B.

The model geometry for the DPF/SPCA system 1000 of an embodiment of the present application is shown in FIG. 2. The geometry and layering of the materials has been tested in a wide variety of combinations and configurations to improve pulse characteristics and minimize cost. In one embodiment, the fission assembly 200 utilizes an outer multiplier layer 210 surrounding the side walls and a proximal end (i.e., an input end) of the chamber 140 of the DPF device 100. The outer multiplier layer 210 may be, for example, a depleted uranium metal layer. A fast neutron multiplier layer 220 is provided at a distal end (i.e., an output end) of the chamber of the DPF device 100. For example, the fast neutron multiplier layer 220 may be a sheet of an aluminum-beryllium alloy such as AlBeMet. The sheet of AlBeMet may, for example, 5 cm thick. An LEU blanket 230 is provided at a distal end of the fast neutron multiplier layer 220. The LEU blanket forms a test cavity 240 boundary. The test cavity 240 may have, for example, a 50 cm inner diameter and a 30 cm height. The outer multiplier layer 210 and the fast neutron multiplier layer 220 dramatically increase the flux, tailor the neutron energy to a fission spectrum, and shape the pulse length. The setup may be encased in a neutron reflector 250 configured to minimize leakage. The neutron reflector 250 may be, for example, a copper reflector or a tungsten reflector. From the earlier discussion of the DPF device 100, the radial pinch 160 which serves as a neutron source is very small in comparison to the fission assembly 200 and can be approximated as a point source 160 with negligible error. The location of the neutron source 160 is marked as a '+' in FIG. 2.

Parametric studies were performed where the materials and thicknesses of the fuel, multiplier, reflector, and other elements were evaluated. Materials were ultimately selected to maximize the magnitude of the fluence within the test cavity. Uranium-molybdenum alloy ($U_{10}Mo$) fuel resulted in the highest fluence and also has ideal thermo-mechanical properties for surviving the repeated pulses. $U_{10}Mo$ fuel has been the fuel of choice for fast burst reactors since the 1960's. Various beryllium and depleted uranium compounds were tested as the outer multiplier layer 210, and depleted uranium metal (DU) was found to yield the highest fluence within the test chamber 240. AlBeMet was selected as the material for the fast neutron multiplier layer 220 sandwiched between the DPF device 100 and the test cavity 240 because of its high beryllium density. The beryllium multiplies the incident fast neutrons and extends the average neutron lifetime, lengthening the duration of the pulse. Copper was selected as the material for the neutron reflector 250, outperforming an array of other materials, including tungsten.

Figure 10:
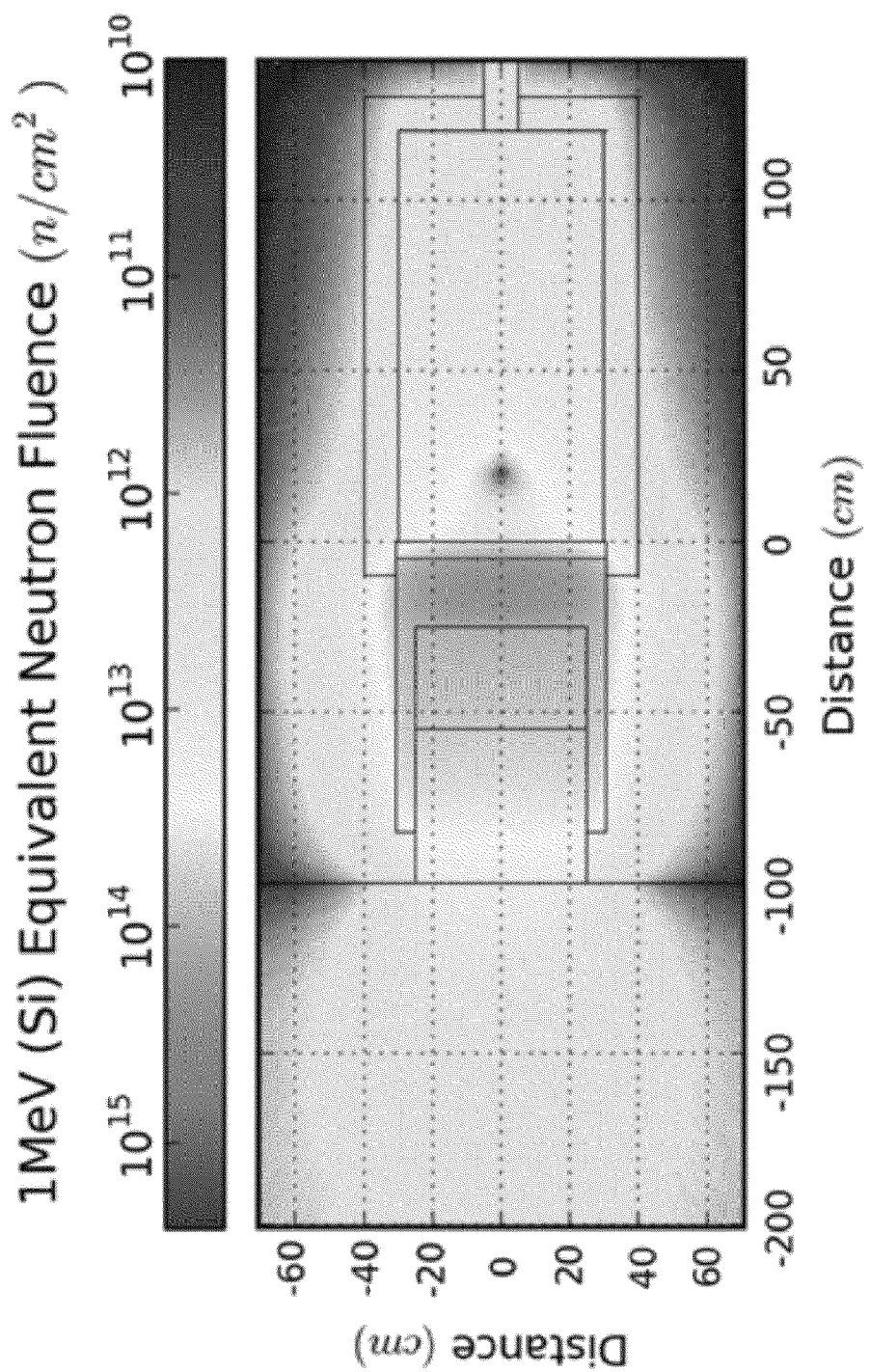
FIG. 10 is graph illustrating the intensity of the neutron fluence as a function of color for a $1 \times 10^{15}$ pulse within the Dense Plasma Focus (DPF) and the sub-prompt critical assembly of FIG. 1.

Using DU as the outer multiplier layer 210, AlBeMet as the fast neutron layer 220, and copper as the neutron reflector 250 with the geometry depicted in FIG. 2, the fluence within the test cavity 240 was uniform radially with gradual variation axially. FIG. 10 plots the intensity of the neutron fluence as a function of color for a $1\times10^{15}$ pulse. The fluence scales linearly with DPF emission. Within the 50 cm by 30 cm test cavity, the peak 1 MeV fluence is $1.5\times10^{14}$ n/cm$^2$ and the average 1 MeV fluence is $8\times10^{13}$ n/cm$^2$. To accommodate objects that cannot fit in the cavity, the 1 MeV fluence one meter below the cavity is $1.5\times10^{12}$ n/cm$^2$. The fission assembly 200 operating at \$0.80 sub-prompt critical extends the 50 ns DPF driver pulse to 35 µs within the test cavity for NDT. The reactivity of \$0.80 would be the maximum allowable configuration to maintain a sufficient safety margin from prompt criticality. Such a margin is consistent with other SPCA designs. See, e.g., Parma, E. J. et al. "*Operational Aspects of an Externally Driven Neutron Multiplier Assembly Concept Using a Z-Pinch 14-MeV Neutron Source (ZEDNA).*" SAND2007-7307, Sandia National Lab., 2007. Beyond safety, as the reactivity is increased above \$0.80, the pulse broadens significantly and can exceed the 45 µs design criteria.

Figure 11:
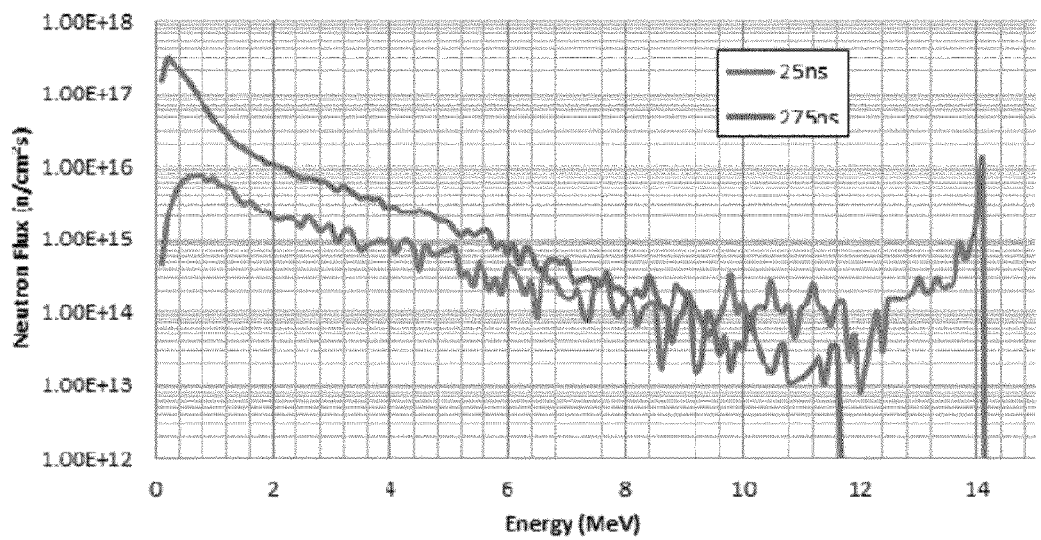
FIG. 11 is a graph illustrating the neutron energy spectra at two moments in time: during the Dense Plasma Focus (DPF) source pulse and after the Dense Plasma Focus (DPF) fusion source has ceased.

Though the 1 MeV (Si) equivalent fluence is an important aspect of the system's performance, the neutron spectra must also be considered. The energy spectrum of neutrons irradiating the sample within the test cavity varies over time. During the first 50 ns when the source neutrons are being generated by the DPF, the neutrons have a dual-peak energy spectrum. The 14.1 MeV neutrons created by fusion are highly penetrating. Therefore, a noticeable fraction of neutrons make it from the DPF chamber 140 into the cavity 240 losing little to no energy, resulting in a local peak near 14 MeV. This feature is balanced by the prompt fissions occurring within the SPCA that create a fission spectrum in the low energy region. Once the neutron production within the DPF has ceased, the spectrum becomes completely fission-like. FIG. 11 shows the neutron energy spectra at two moments in time: during the DPF source pulse and after the DPF fusion source has ceased. The spectrum after 275 ns maintains the same fission-like distribution, but decreases in magnitude. In the present application, the 14 MeV peak has been reduced compared to previous designs by increasing the amount of LEU between the DPF chamber 140 and the test cavity 240. This ensures better utilization of the source neutrons in causing fission, thus increasing the delivered fluence.

Figure 12:
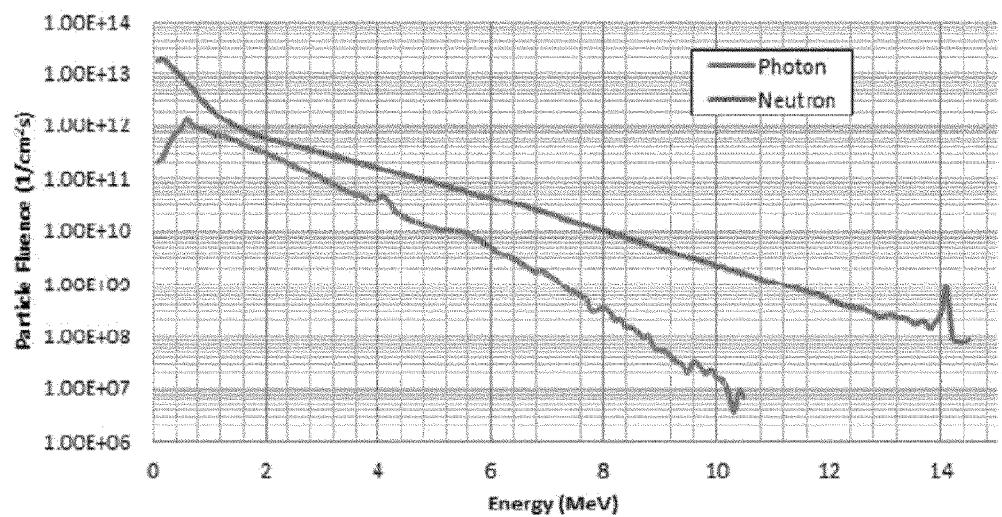
FIG. 12 is a graph illustrating the spectrum of the photon fluence from the Dense Plasma Focus (DPF) driven pulse alongside spectrum of the neutron fluence.

The photon energy deposition must also be examined to ensure that the system meets the requirements described in Mil-Std 883J. Photons are mainly produced at energies below 10 MeV with the most common energy being approximately 1 MeV. FIG. 12 shows the spectrum of the photon fluence from the DPF driven pulse alongside spectrum of the neutron fluence. Mil-Std 883J specifies that no more than 500 Rads can be deposited per $1\times10^{12}$ 1 MeV (Si) equivalent fluence. See "Test Method Standard Microcircuits," Department of Defense, MIL-STD-883J, February 2010, the entire contents of which are incorporated herein by reference. The cavity system easily meets this requirement, with an average deposition of 90 Rads per $1\times10^{12}$ 1 MeV (Si) equivalent fluence within the test cavity.

Figure 13:
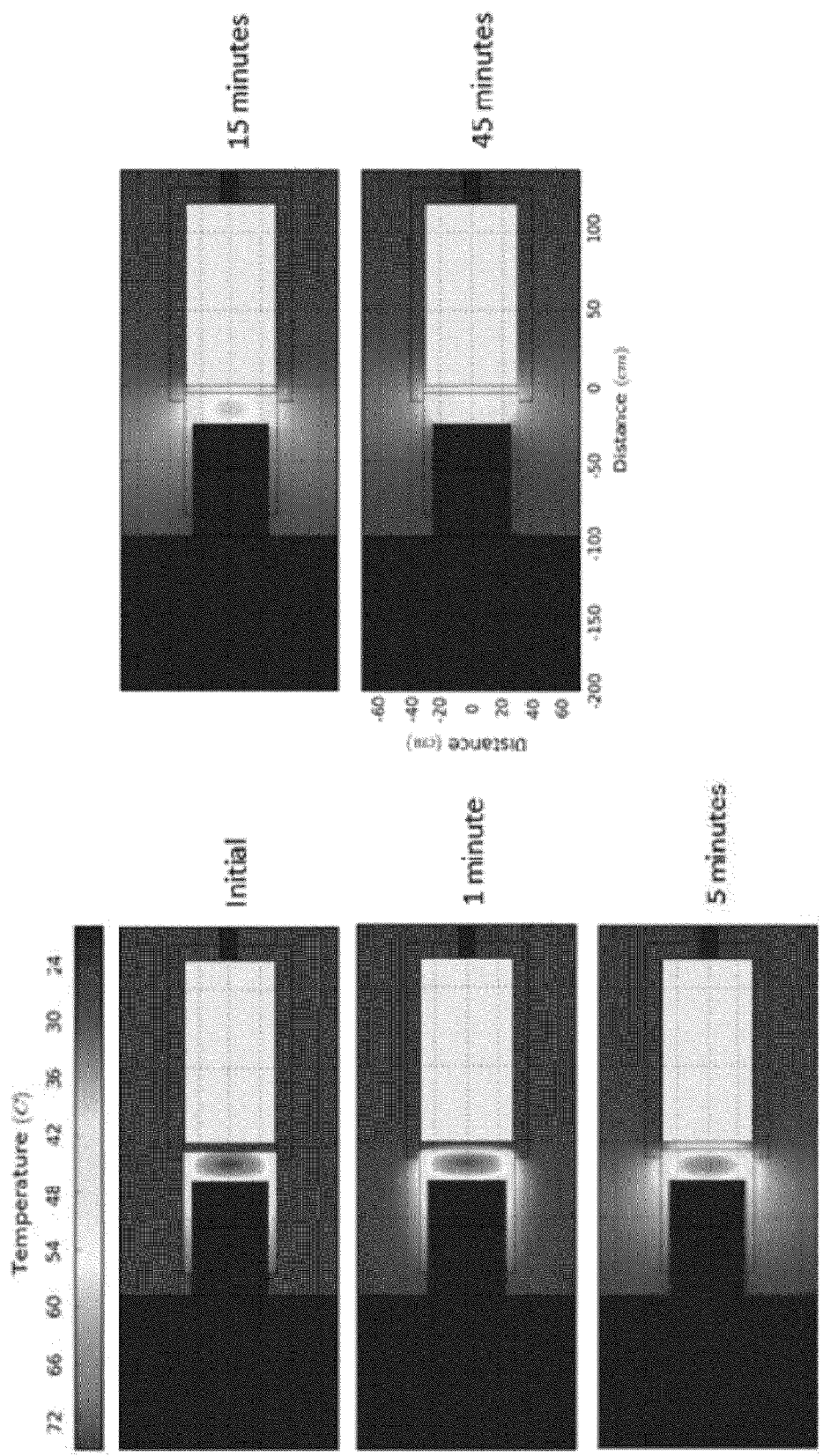
FIG. 13 illustrates the temperature profile within the Dense Plasma Focus (DPF) and the sub-prompt critical assembly of FIG. 1 at various time steps following the pulse.
Figure 14:
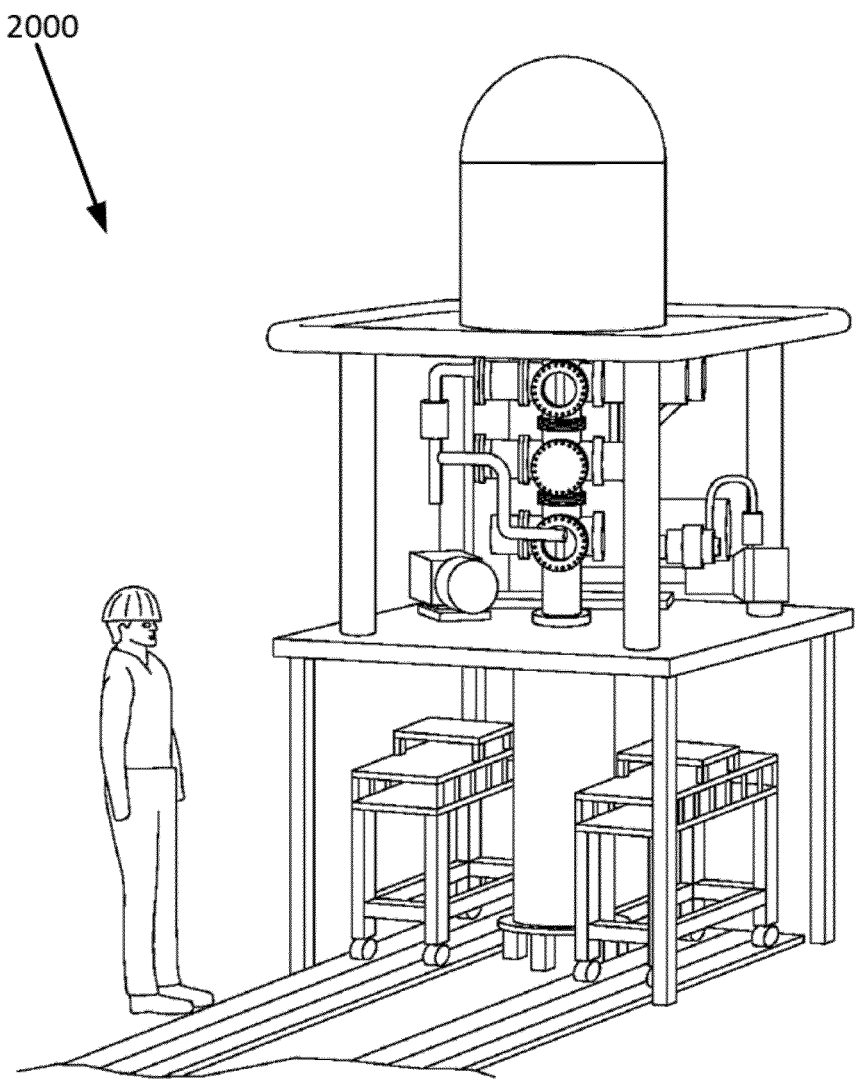
FIG. 14 illustrates an embodiment of system for producing a high flux of neutrons that includes a gas-target neutron generator neutronically coupled to a subcritical or a sub-prompt critical assembly.

Heat generation data from MCNP were analyzed with a two-dimensional, time-dependent finite difference solver to view the evolution of the system temperature. The majority of the fission energy is generated within a 100 microsecond or less timeframe. Even though the thermal diffusivity of the fuel is appreciable, the short time scale of the energy deposition suggests that the characteristic heat transfer length over this time scale is on the order of 0.1 mm. Such a small characteristic transfer length allows for the initial temperature profile to be formed from the adiabatic energy deposition throughout the pulse with negligible error. The local energy deposition can be obtained with good spatial resolution using MCNP. Given the initial temperature distribution, the finite difference solver models the conductive and convective heat transfer over time. FIG. 13 shows the temperature profile within the system at various time steps following the pulse. With the system initially at equilibrium with the room (25° C.), at the end of the pulse the maximum fuel temperature is approximately 75° C. The peak temperature diminishes to 50° C. forty five minutes after the pulse. The model assumes that the DPF device 100 reaches 50° C. during the pulse and that the DPF chamber 140 is insulated from its jacket. The convective heat transfer at air boundaries was modeled with a conservative heat transfer coefficient of 5 W/m$^2$-K. Because of the low peak temperature and return to slightly above nominal conditions within the hour, a forced cooling system would not be necessary.

System 2: Gas-Target Neutron Generator Closely Coupled with a Fission Assembly

Referring generally to FIGS. 14-27, a system 2000 for producing very high fluxes of neutrons includes a gas-target neutron generator 300 closely coupled with a fission assembly 400. The fission assembly 400 may be either a subcritical fission assembly or a sub-prompt critical fission assembly. As used herein, the terms sub-prompt critical fission assembly and sub-prompt critical assembly are synonymous and interchangeable. The gas-target neutron generator 300 includes an ion source 310, an accelerator 320, a plurality of focus elements 330, and a pumping/gas-target section 340. The target gas of the gas-target neutron generator 300 may be, for example, either deuterium or tritium. The gas-target neutron generator 300 may be powered by a high voltage power supply 350. Each of these subcomponents will be discussed in further detail below.

An example of such a gas-target neutron generator that can be coupled with the subcritical fission assembly is described in U.S. patent application Ser. No. 12/810,958, filed on Jul. 26, 2010, which has issued as U.S. Pat. No. 8,837,662, the entire contents of which are incorporated herein by reference in its entirety.

Figure 15:
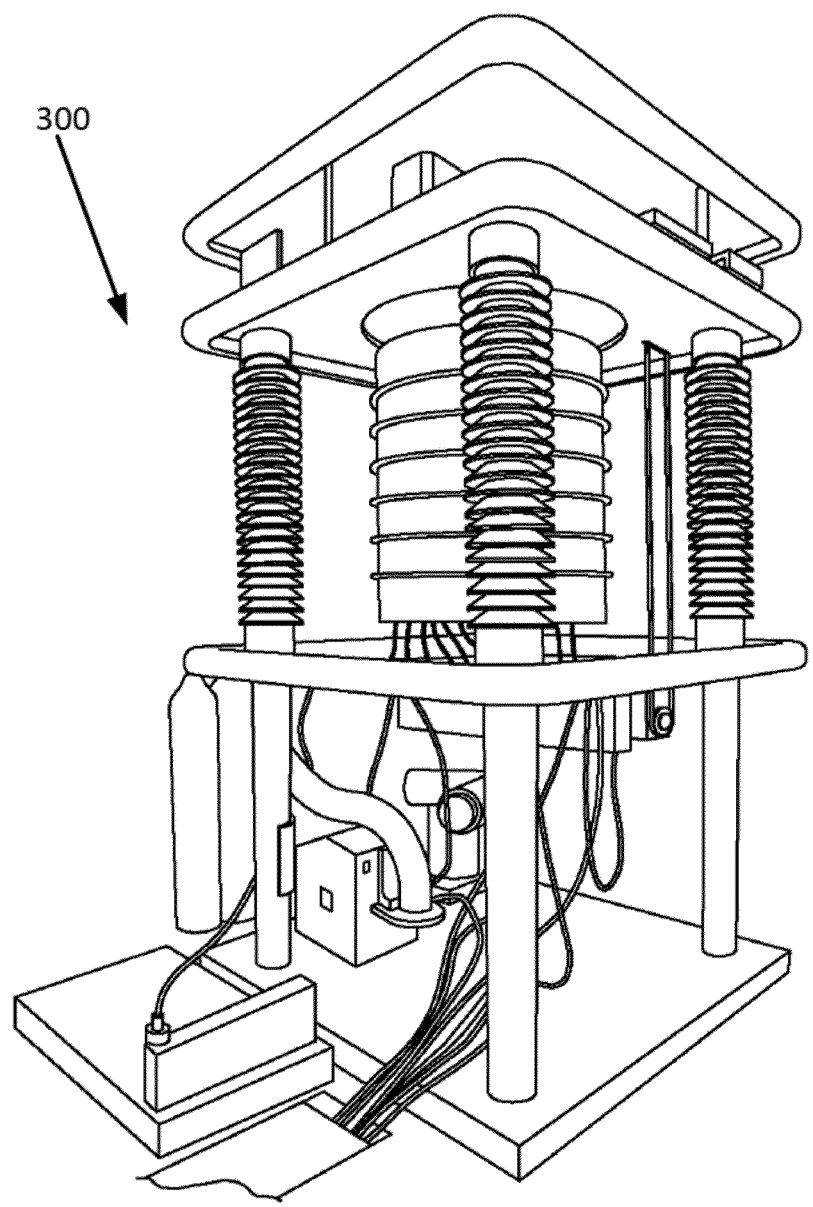
FIG. 15 is a front, isometric view of the gas-target neutron generator of FIG. 14.
Figure 17:
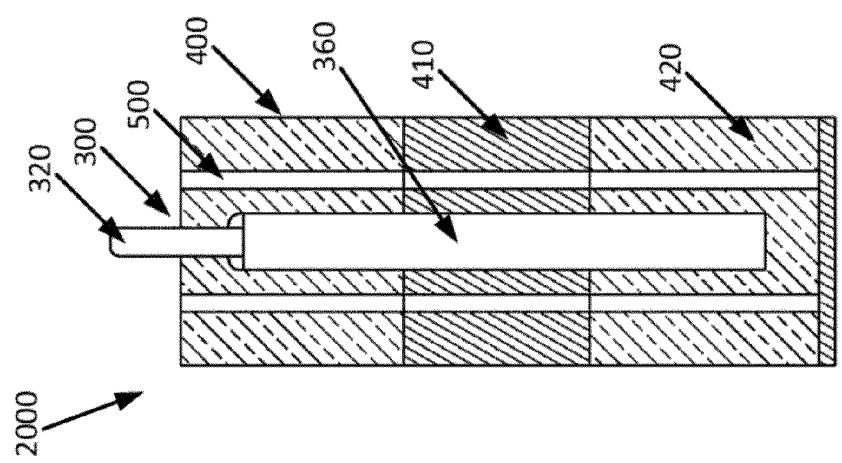
FIG. 17 is a cross-sectional view of the system of FIG. 16 through the line B-B.
Figure 16:
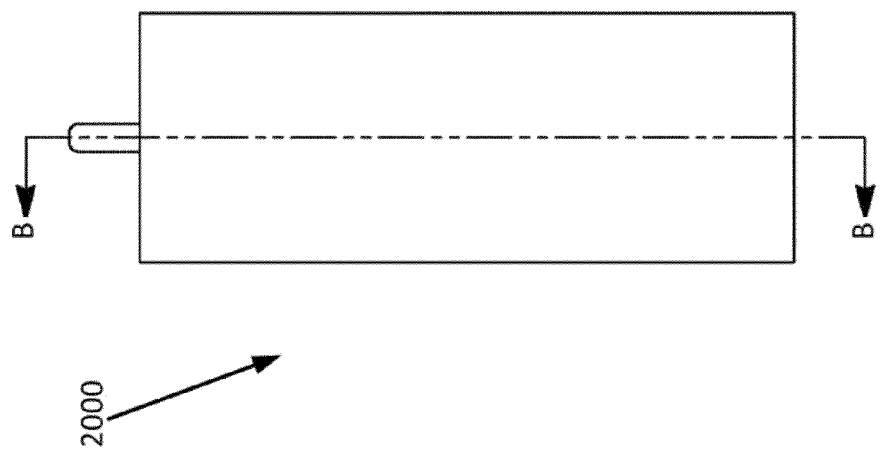
FIG. 16 is a schematic illustration of a side view of the system of FIG. 14.

FIG. 15 shows a prototype of a gas-target neutron generator 300 that may be part of a steady-state irradiation unit for a fast burst reactor such as the fast burst reactor at WSMR. The gas-target neutron generator 300 is configured to produce $2.5\times10^{13}$ energetic neutrons per second by colliding a deuterium (D) ion beam with tritium (T) gas in a gas target chamber 360 in the pumping/gas-target section 340. D-T reactions have a lower energy threshold than any other neutron-producing, accelerator-driven reaction. D-T reactions also have a large cross section, and thus, yield neutrons at high efficiency. These properties allow the neutron driver to use simple electrostatic accelerators and to have high output and a long lifetime.

There are many commercially available DD and DT neutron generators, but most of them utilize solid targets that limit the lifetime and neutron yield. In one embodiment, the gas-target neutron generator 300 utilizes a gaseous tritium target, which allows for significantly increased neutron yield as well as target lifetimes measured in years rather than hours. Currently, the gas-target neutron generator 300 can operate in a steady-state mode with equivalent DT neutron yields in the mid-$10^{13}$ n/s. Coupling the gas-target neutron generator 300 with a subcritical fission assembly 400 results in an additional 50 to 100-fold increase in neutron production and the resulting average neutron energy will be very close to the fission spectrum. Such a system 2000 surpasses the steady-state neutron production rates of the WSMR fast burst reactor, is electronically controlled, and does not utilize highly enriched uranium.

High Voltage Power Supply (HVPS)

Figure 19:
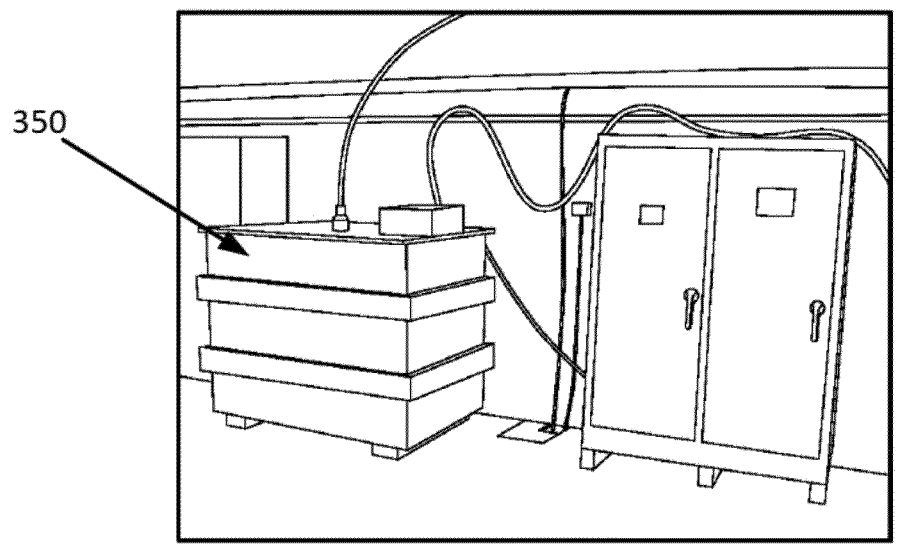
FIG. 19 is a front, isometric view of a high voltage power supply.

Referring to FIG. 19, in one embodiment, the high voltage power supply (HVPS) 350 is a 300 kV power supply configured to provide voltage to a high voltage dome of the system 2000. The HVPS 350 has been specifically designed to power the gas-target neutron generator 300 and has demonstrated stable operation at full power through a series of tests. The HVPS's protective features may include 1 µs overload detection, low stored energy, inductive current limiters, and a complete shutdown time of 50 µs. Furthermore, the HVPS 350 may be fully computer-controlled, allowing for simple and flexible remote operation.

Ion Source

An ion source 310 is configured to produce an ion beam. In one embodiment, the ion source 310 is configured to produce a deuterium ion beam. The ion source 310 is comprised of a microwave ion source for ion generation and an extractor for producing an ion beam for transport to the accelerator 320, located downstream of the ion source 310. The ion source 310 may operate at an extraction current of 10-200 mA. In one embodiment, the ion source includes a 30 mA microwave ion source. The 30 mA microwave ion source is not a limit based on ion injector technology, but rather stems from a desire to have a conservative baseline case. The ion source 310 may be a single ion source capable of delivering greater than a 100 mA $D^+$ beam current, allowing for greater neutron flux. A prototype ion source has been operated at extraction currents as high as 75 mA, as measured by a calibrated calorimeter located 50 cm downstream of the extraction aperture.

Accelerator

Figure 20:
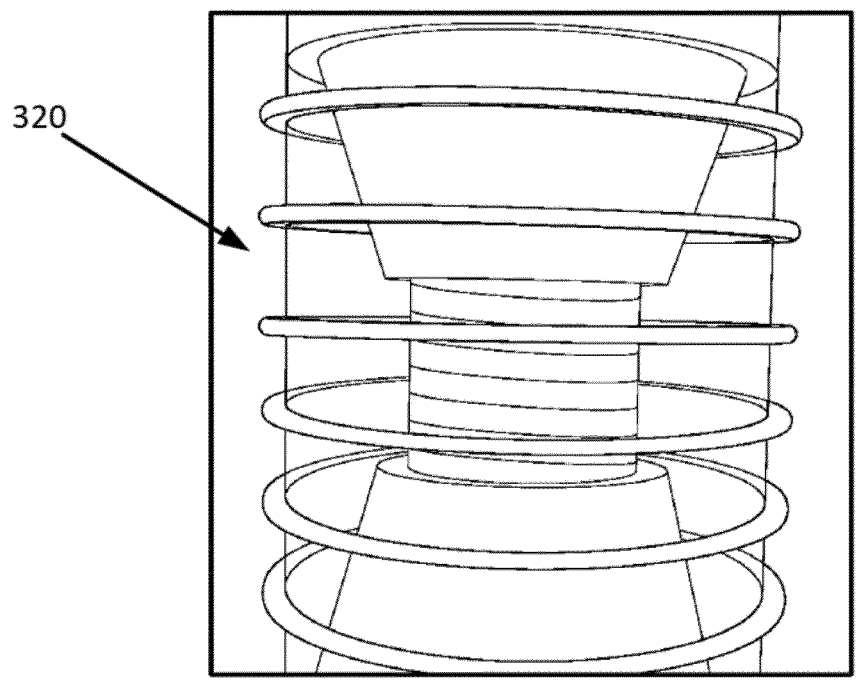
FIG. 20 is a front view of a 300 kV accelerator section.

Referring to FIG. 20, the accelerator 320 is configured to accelerate the ion beam produced by the ion source 310 to produce an accelerated ion beam. For example, if the ion source 310 produces a deuterium ion beam, the accelerator 320 produces an accelerated deuterium ion beam. In one embodiment, the accelerator 320 is a 300 kV accelerator column. The accelerator 320 operates by transferring a voltage gradient developed by external resistors to internal lenses. Analytical models generated by indicate that the fraction of beam transported from the ion source 310 to the gas target chamber 360 will approach 100% by implementing this design. The accelerator 320 components are designed to have very low voltage gradients. Hipot testing of the accelerator 320 has revealed that it is very stable and has thus far been operated up to 275 kV.

Focus Elements

Figure 21:
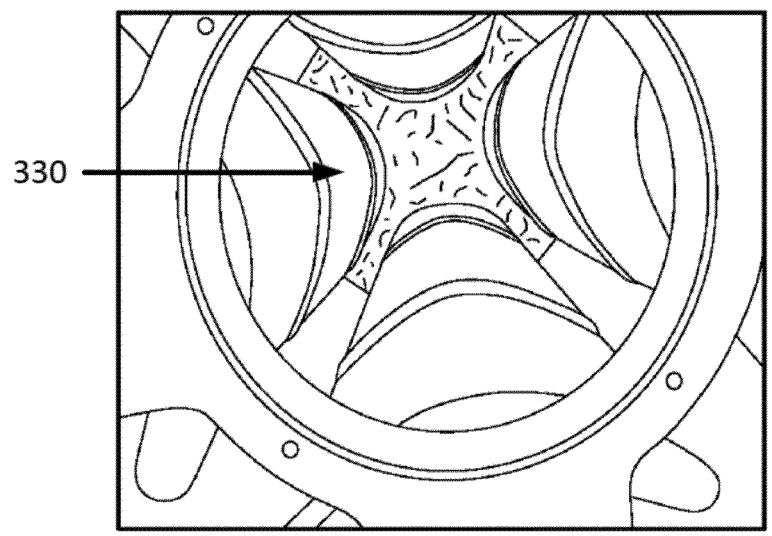
FIG. 21 is a top view of an electrostatic quadrupole.
Figure 22:
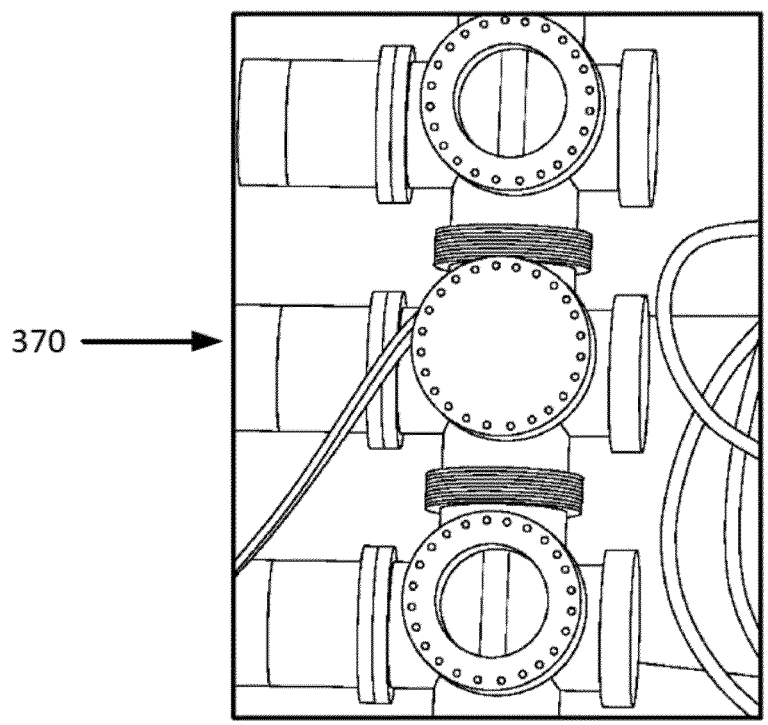
FIG. 22 is a side view of a differential pumping system having three stages.

Referring now to FIG. 21, a plurality of focus elements 330 are configured to focus the accelerated ion beam produced by the accelerator 320 in a horizontal direction (i.e., an x-direction) and a vertical direction (i.e., a y-direction). The plurality of focus elements 330 may be comprised of a plurality of electrostatic quadrupole elements or a plurality of magnetic solenoid elements. In one example, the electrostatic quadrupole elements are configured to transport and focus a divergent (expanding) 50 mA, 250-300 kV deuterium ion beam through the pumping/gas-target section 340 from a multi-stage differential pumping system 370 to a gas target chamber 360. In the current configuration, the desired focus position is approximately 2 meters from the end of the accelerator 320 to the gas target chamber 360. It is desired that the accelerated ion beam be as small as possible upon entrance to the gas target chamber 360.

As seen in FIG. 21, in one embodiment, the electrostatic quadrupole elements 330 include four electrodes equally spaced around a central axis, creating two opposing pairs of electrodes. When the pairs are biased to the same magnitude of voltage, but with opposite bias (i.e. one pair positive, one pair negative), a hyperbolic field distribution is created between the plurality of electrostatic quadrupole elements 330. A series of these electrodes causes the accelerated ion beam to become focused in both the x-direction and the y-direction.

Pumping and Gas-Target

Once the ion beam leaves the plurality of focus elements 330, it is on a ballistic trajectory towards the gas target chamber 360. In one embodiment, the gas target chamber 360 is filled with tritium gas to a pressure of about 0 to about 100 torr, about 100 mtorr to about 30 torr, suitably about 0.1 to about 10 torr, or suitably about 100 mtorr to about 30 torr. The specific geometry of gas target chamber 360 may vary depending on its primary application and may include many variations. In one example, the gas target chamber 360 may suitably be a cylinder about 10 cm to about 5 m long, and about 5 mm to about 100 cm in diameter.

In one embodiment, the gas target chamber 360 is operated at approximately 10 Torr, and a pressure of less than 50 µTorr is simultaneously maintained in the accelerator 320. This large pressure differential is accomplished using three stages of pumps in a differential pumping system 370 (see FIG. 22). In particular, the differential pumping system 370 is configured to maintain a first pressure differential between an outside atmosphere and the accelerator 320, a second pressure differential between the outside atmosphere and the gas target chamber 360, and a third pressure differential between the accelerator 320 and the gas target chamber 360. The differential pumping system 370 may include a first end being the accelerator 320 at a first pressure (e.g., 50 µTorr) and a second end being the gas target chamber 360 at a second pressure (e.g., 10 Torr); at least one vacuum chamber connecting the first end to the second end that allows passage of the ion beam from the first end to the second end of the differential pumping system 370; and at least one vacuum pump connected to each vacuum chamber, the vacuum pump configured to exhaust into an adjacent vacuum chamber that is higher in pressure to maintain the first pressure differential, the second pressure differential and the third pressure differential. Each differential pumping section is separated by a flow restriction (~1 $cm^2$) that allows the ion beam to pass, but minimizes gas flow from the previous stage. The exhaust from each pumping stage returns to the adjacent, higher pressure stage.

The differential pumping system 370 has been fully tested. Using 1 cm diameter apertures between each differential section, the differential pumping system 370 was able to hold a 10 Torr pressure in the gas target chamber 360, while maintaining a pressure of 36 micro-Torr in the accelerator 320. In one embodiment, the differential pumping system 370 utilizes Agilent TV-1001 turbomolecular pumps. According to the manufacture's specification, the Agilent TV-1001 turbomolecular pumps have mean times to failure of 200,000 hours in the vacuum-facing components. See Agilent Technologies. *Agilent Vacuum Product Catalog*. Published by Agilent Technologies, Italy, June, 2012, the entire contents of which are incorporated herein by reference.

In an embodiment in which the ion beam produced by the ion source 310 is a deuterium ion beam and the target gas is tritium gas, when the accelerated deuterium ions interact with the tritium gas in the gas target chamber 360, many atomic and nuclear interactions occur in the gas target chamber 360. One of the interactions is a fusion nuclear reaction, which generates 14 MeV neutrons. Neutron source strengths of $3 \times 10^{11}$ n/s from D-D reactions have been measured using both He-3 detectors and activation foil techniques. This neutron yield agrees with simple cross-section models developed by Phoenix Nuclear Labs to within 20%. These same models predict a neutron intensity of $3 \times 10^{13}$ n/s from 30 mA of deuterons striking tritium gas.

In embodiments in which the gas-target neutron generator 300 uses tritium as the target gas, atomic reactions between the accelerated ion beam and the tritium gas cause the accelerated ion beam to be stopped before reaching the bottom of the gas target chamber 360. These reactions generate up to 9 kW of heat in the gas target chamber 360 that must be removed by water cooling. A very small percentage of the accelerated ion beam may also be scattered into the gas target chamber walls, and the water cooling removes this heat as well. The neutron yield is controlled by varying a percentage of pure tritium gas in the gas target chamber 360. As the accelerated deuterium ions interact with the tritium gas in the gas target chamber 360, the tritium gas becomes mixed with deuterium, resulting in a mixed tritium and deuterium gas. As the tritium gas becomes mixed with deuterium, the production of neutrons becomes less efficient and, therefore, the n/s generated naturally decreases. The gas-target neutron generator 300 further includes a tritium purification system. During operation of the gas-target neutron generator 300, the tritium purification system is configured to purify the mixed tritium and deuterium gas resulting from the interaction between accelerated deuterium ions and the tritium gas in the gas target chamber 260, and return purified tritium gas into the gas target chamber 260. The tritium purification system is configured to control a neutron output of the gas-target neutron generator 300 by controlling a percentage of tritium in the gas target chamber 360, namely by controlling a flow rate of the purified tritium gas into the gas target chamber 360.

The gas target chamber 360 is surrounded by the fission assembly 400 and is exposed to high neutron flux levels. The materials and design for the gas target chamber 360 were selected to handle corrosion and damage due to the high neutron flux levels, compatibility with the cooling water, and compatibility with the fission assembly 400 materials.

The fission assembly 400 may be either a subcritical fission assembly or a sub-prompt critical fission assembly.

In a subcritical fission assembly, $k_{eff}$ is less than 1. Therefore, if external neutrons are injected into the system, they will be multiplied by the subcritical fission assembly such that more neutrons are produced. However, the subcritical fission assembly neutrons are not self-sustaining. If the external neutron source (i.e., the gas-target neutron generator 300) is removed, the subcritical fission assembly will stop producing neutrons almost instantaneously. For steady-state applications, it is beneficial to use a subcritical fission assembly as opposed to a sub-prompt critical assembly, to prevent the system from oscillating between high and low values of $k_{eff}$, and/or to prevent the system from settling down to a $k_{eff}$ value that might be critical.

An assembly is prompt critical if for each nuclear fission event, the prompt neutrons released from a nuclear fission event cause an additional nuclear fission event. In other words, the effective neutron multiplication factor $k_{eff}$ equals one, and the chain reaction is self-sustaining. The sub-prompt critical fission assembly has a $k_{eff}$ greater than 1, but less than the sub-prompt critical value for that system. Although the specific sub-prompt critical value is different for every system, it is generally around 1.008. If external neutrons are sent into this system, and the system was perfectly cooled, the amount of new neutrons produced would continue growing. If the external source was removed, the neutrons would continue to be produced. However, in actual practice, the heat generated from the fissions occurring cause the $k_{eff}$ of the system to drop below 1. This is ideal for a pulsed source of neutrons because the system can have a higher $k_{eff}$ (for example, 1.005), which results the neutron multiplication being relatively high. However, the system is also safe because the pulse will be automatically shut off if the external source of neutrons is removed.

Subcritical Fission Assembly and MCNP Results

The gas-target neutron generator 300 coupled to the subcritical fission assembly 400 will meet the steady-state test requirements of 2e10 n/cm$^2$-s at WSMR. As discussed above, neutrons collide with anything around them. Therefore, the fission assembly 400, which is located proximate to the gas-target neutron generator 300, is neutronically "coupled" to the gas-target neutron generator 300 in that the gas-target neutron generator 300 is the source of initiating neutrons. The fission assembly 400 will maintain a certain $k_{eff}$ with or without the presence of first order external neutrons if the temperature is constant. For a $k_{eff}$ around 1, the fissile material "multiplies" the fusion source neutrons (i.e., neutrons from the gas-target neutron generator 300) via inducing fissions and creating more neutrons. Thus, the fission assembly 400 is neutronically coupled to the gas-target neutron generator 300.

The system 2000 including the gas-target neutron generator 300 coupled with a subcritical fission assembly 400 was modeled using the Monte Carlo N-Particle (MCNP) simulation developed at Los Alamos National Laboratory (LANL). This allowed for precise tracking of different types of radiation and their interactions within the designed system, allowing for a determination of both safety and performance parameters. It is important to consider the cost, safety, and reliability of the design. As such, all of these considerations will be discussed alongside the performance characteristics of the design.

Through the design process, the fission assembly has been changed due to an ongoing series of trade studies including geometric, material, performance, cost, and heating studies. For example, the initial geometry of the system included a test cavity over which acceptable flux levels could be delivered, with all points in the cavity receiving within 20% of the average. With the cavity, hundreds of assemblies were modeled ranging from reflected cylinders to a moderated fuel pin structure. In each assembly, the materials and enrichments comprising the reflector, moderator, fuel, and multiplier were modified. While many of these designs were successful at lowering cost or reducing the burden of heating, the cavity design for the system 2000 was deemed far too restrictive regarding test sample size. Yet, these trade studies assisted in understanding the interplay between specific problem constraints and system performance, and ultimately informed the choices made for the final design of the fission assembly.

The final geometry of the core has been designed for non-destructive testing (NDT), not only with respect to sample size but also with respect to neutron flux quality. Initially, it was thought that maximizing the total neutron flux delivered to the testing regions would be the primary goal of NDT. This led to thermal systems which heavily moderated the neutrons in order to maximize the neutron multiplication from fission. While it did effectively increase the total neutron flux, it was uncertain whether or not this ensured a high fidelity flux for NDT. Therefore, the previous results were reevaluated using the 1 MeV Si equivalent flux from kermas developed by Griffin. See Griffin. P. J. et al., "Neutron Induced Displacement Damage in Silicon," SAND92-0094, Sandia National Lab, 1993, the entire contents of which are incorporate herein by reference. The kermas convert a total neutron flux to an equivalent flux by relating the neutron energy to the damage caused in silicon. By applying these kerma to the previous neutron spectra, it was found that the thermal systems were severely underperforming, as thermal neutrons are much less likely to cause damage.

With this in mind, the system was redesigned without moderation to produce a harder spectrum. This yielded much higher equivalent fluxes, and as such, the equivalent flux was adopted as the standard flux for benchmarking the design and comparing results. FIGS. 14-17 display the final geometry of the system 2000. In operation, the ion beam from the accelerator 320 enters the fission assembly 400 at the top of the gas target chamber 360 (which is surrounded by the fission assembly 400). Although not illustrated, in one embodiment, there is a 0.1 mm thick coating on the inside of the gas target chamber 360. The gas target chamber 360 may be surrounded, for example, by cylinders of fuel 410 and/or cylinders of a reflective material 420. In one embodiment, the fuel 410 is $U_{10}Mo$ fuel enriched to 19.5%, and copper. The $U_{10}Mo$ may be centered on the gas target chamber 360 (i.e., may be concentric to the gas target chamber 360) and has a height, for example, of 35 cm with an outer radius, for example, of 22.7 cm. The reflective material 420 may be copper. The reflective material 420 may form a shield having an outer radius, for example, of 22.7 cm and a height, for example, of 42.5 cm, extending, for example, 10 cm above and below the gas target chamber 360. The reflective material 420 is configured to act as a shield and a reflector, forcing the neutrons back into the fuel 410 to increase the multiplication and ensure that the flux is being delivered to the testing region. Finally, the system 2000 may include a plurality of water pipes 500. In on example, the system 2000 includes eight cylindrical water pipes 500 with a radius, for example, of 1.75 cm. Each of the water pipes 500 is configured to travel through the height of the system 2000 in order to provide cooling. One of ordinary skill in the art will appreciate that in other embodiments, the dimensions discussed above may vary.

Using MCNP, the total power production for the steady-state device was found to be 24.7 kW. Referring to FIG. 18, it can be observed that the heat will be generated in a thick cylindrical solid, which will very quickly cause the temperature in the fuel to rise. For example, for a system producing 24.7 kW in a thick (e.g., 17.7 cm) solid, cooling becomes a non-trivial task. In order to alleviate the heat generation within the fuel, in the embodiment of FIG. 18, eight water pipes 500 of 1.75 cm radii were introduced which span the height of the system 2000. As the system 2000 is assumed to be sitting in stagnant air, the water pipes 500 were required to remove the heat generated at steady-state. Further, MCNP simulations have also shown that the water pipes 500 serve to initially moderate neutrons, enhancing the neutron flux by upwards of 50% outside the assembly.

Figure 23:
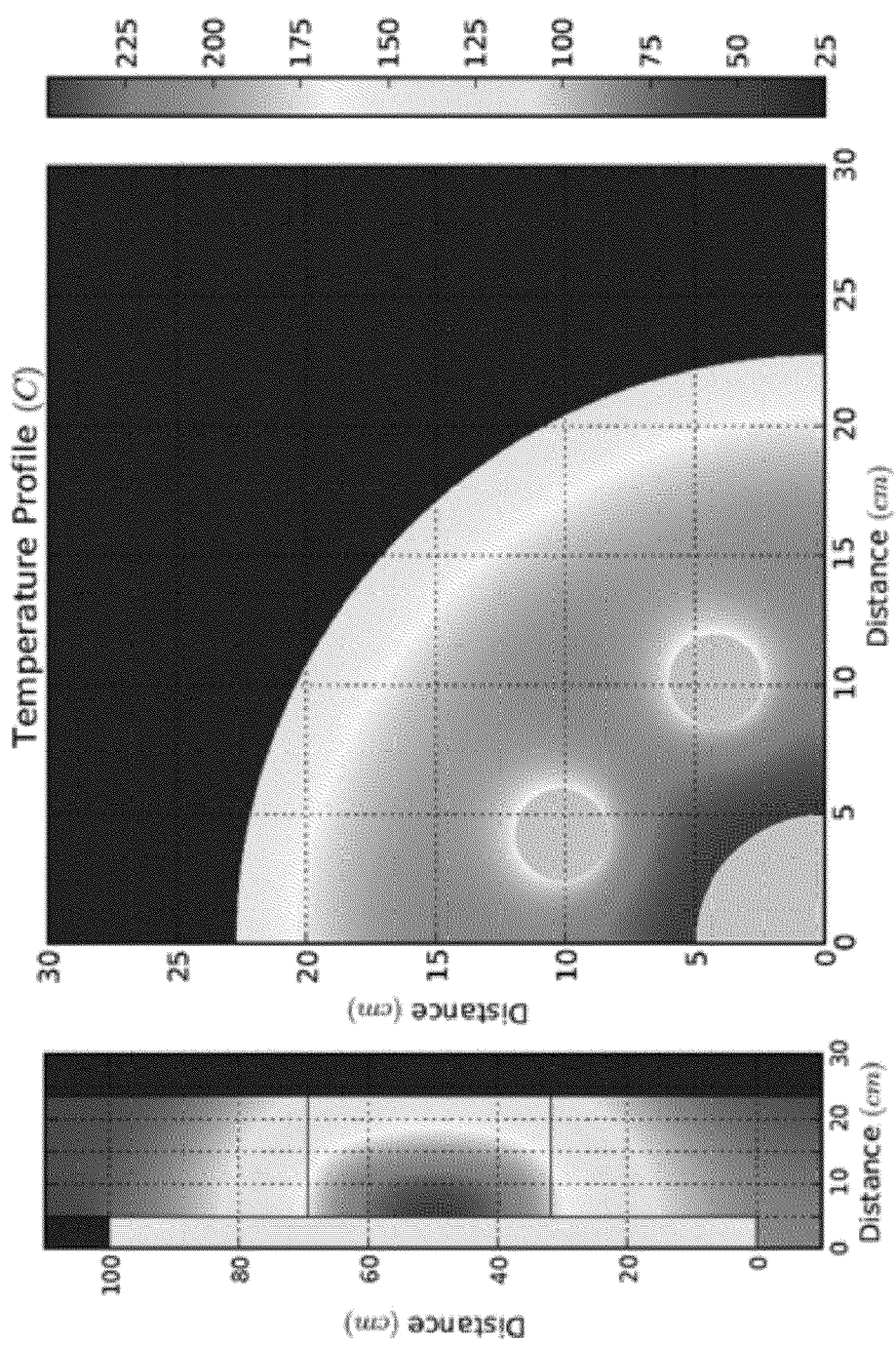
FIG. 23 illustrates an axial temperature distribution, as well as a radial temperature distribution at a center of the core at steady-state.
Figure 24:
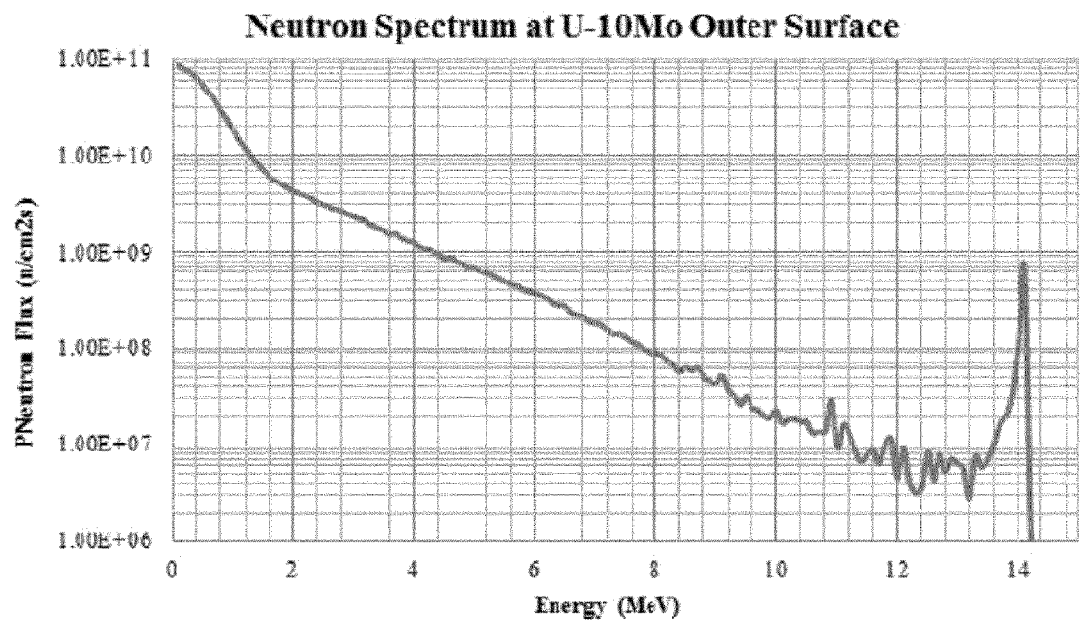
FIG. 24 is a graph illustrating a neutron spectrum taken at the outer surface of the $U_{10}Mo$.
Figure 25:
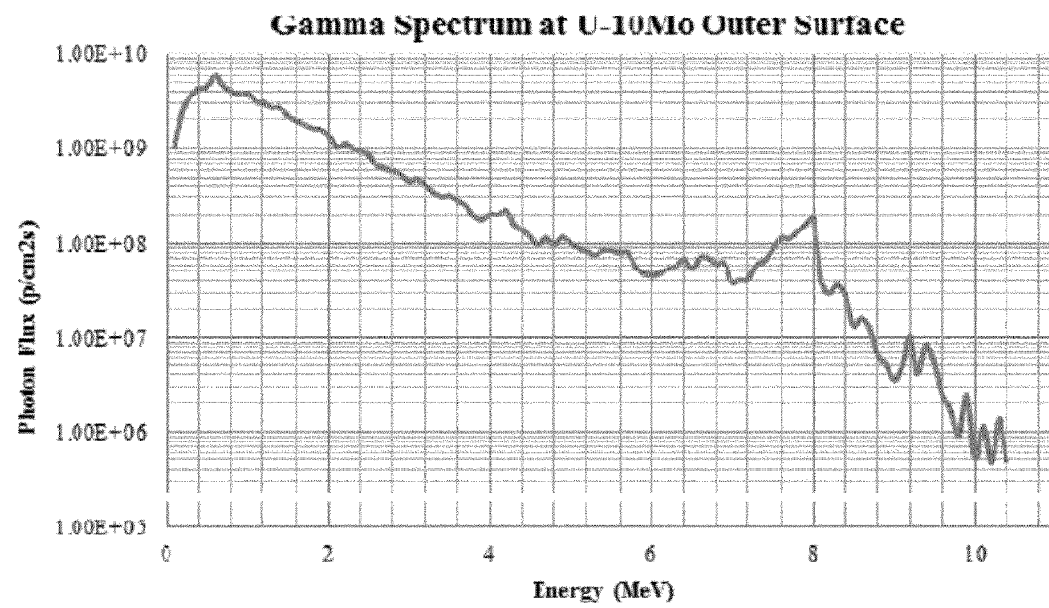
FIG. 25 is a gamma spectrum taken at the outer surface of the $U_{10}Mo$.

A two-dimensional finite difference heat conduction solver was developed in order to determine the steady-state temperature of the core using the power production data from MCNP. FIG. 23 shows the axial temperature distribution, as well as the radial temperature distribution at the center of the core. It should be noted that the gas target chamber 360 was assumed to be a non-communicating insulated boundary. Non-communicating cells with an insulated boundary condition is a very good approximation for the gas target chamber 360, as the conduction and convection in the very low pressure gas is negligible. For the other boundary conditions stagnant air and water pipes 500 were assumed to be convective boundaries with heat transfer coefficients of 5 $W/m^2$-K and 500 $W/m^2$-K respectively. The maximum temperature in the fuel was found to be 245° C. with the aforementioned heat transfer capabilities. Under the assumption that the water could be pressurized and run at appreciable flow rates, a heat transfer coefficient of 500 $W/m^2$-K is easily attainable for such a system. If lower temperatures are desired, the heat transfer coefficient of water in forced flow can reach 1000-10000 $W/m^2$-K, and as such the maximum fuel temperature can be tailored to the desire of the user. With these considerations in mind, it does not appear that the maximum temperature in the fuel will be a limiting feature.

The current geometry of the system 2000 was driven heavily by the desire to deliver or exceed the current capabilities of WSMR, while also minimizing the costs of constructing such a device. This was done primarily by simulating hundreds of geometries and fuel enrichments and analyzing them on the cost of the fuel, where the cost of the fuel was simply calculated as the mass of the fuel multiplied by the cost (per unit mass) of enriching uranium to the selected enrichment. This slowly transformed the fuel geometry to its current state from its previous iterations which had similar outer radii, but were much taller. While those systems could easily exceed the capabilities of WSMR by as much as a factor of four, the costs associated with their construction would be prohibitive. Table 3 shows the mass and volumes of materials utilized in the system 2000 of the present application.

TABLE 3

| Material | Mass (Volume) |
| --- | --- |
| Tritium | 0.01173 g (7.8210 $cm^3$) |
| U-10Mo (19.5% Enr.) | 878.4 kg (0.0512 $m^3$) |
| Copper | 1148.3 kg (0.1282 $m^3$) |

As compared to initial designs, fuel inventory has been decreased by over 65%, and tritium inventory has been decreased by over 55%.

In order to evaluate the capabilities of the design, MCNP was used to determine neutron spectrum, gamma spectrum, energy deposition, and 1 MeV Si equivalent neutron flux. The neutron and gamma spectrum taken at the outer surface of the $U_{10}Mo$ can be seen in FIG. 24 and FIG. 25, respectively. The neutron spectrum looks nearly identical to the U-235 fission spectrum with the exception of the peak at 14.1 Mev, which represents the small fraction of neutrons which are generated in the gas target chamber 360 and are able to penetrate through the fuel without interaction. The spectrum is as expected, as the system 2000 is designed to focus neutrons into the fuel to be multiplied through fission. The energy deposition was also measured just outside the $U_{10}Mo$ surface where it is most likely testing will occur. Note that to be within specifications, the energy deposition must be less than 500 rads per 1e12 1 MeV equivalent neutron flux. The energy deposition of the final design was found to be 77.0 rads per 1e12 1 MeV equivalent neutron flux, which is well below the maximum allowable value.

Figure 26:
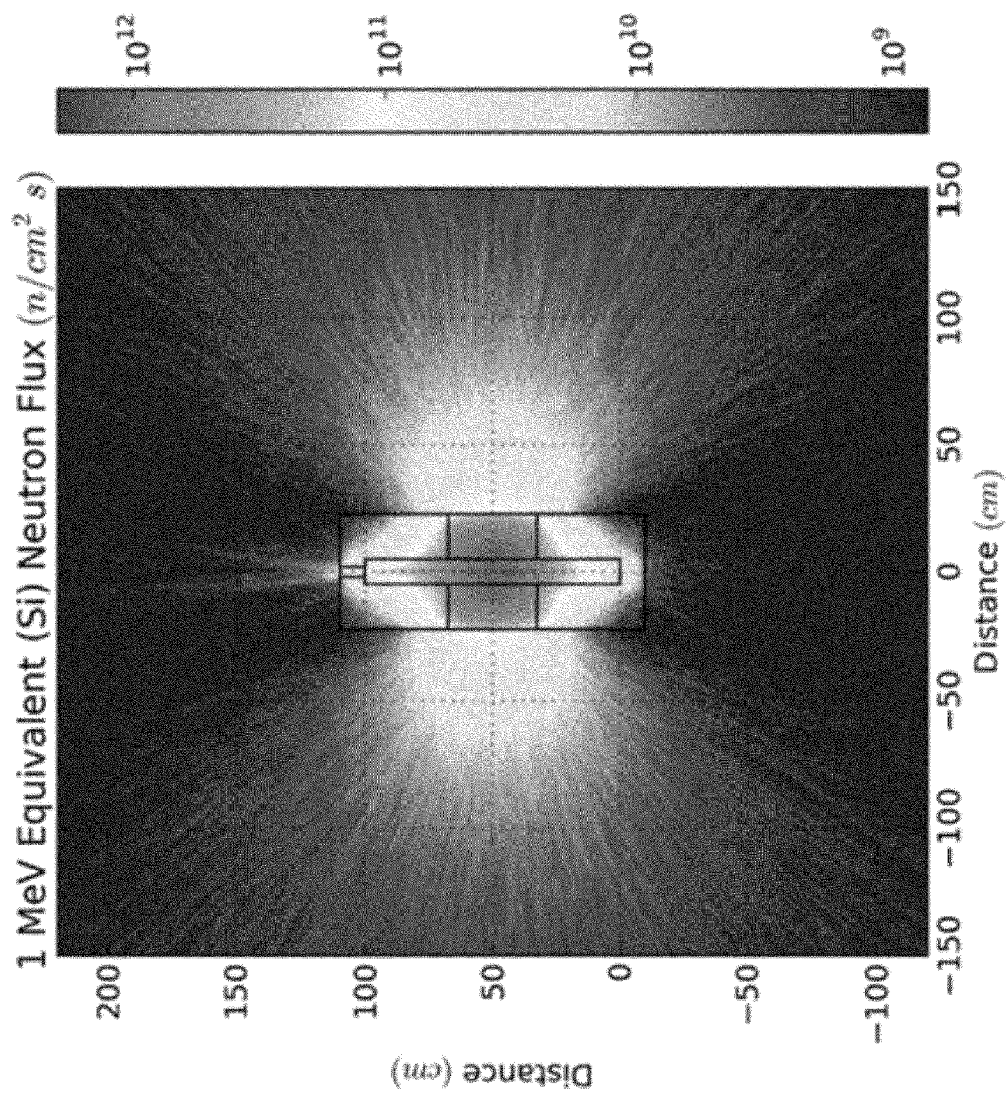
FIG. 26 illustrates an axial view of the 1 MeV Si equivalent neutron flux.
Figure 27:
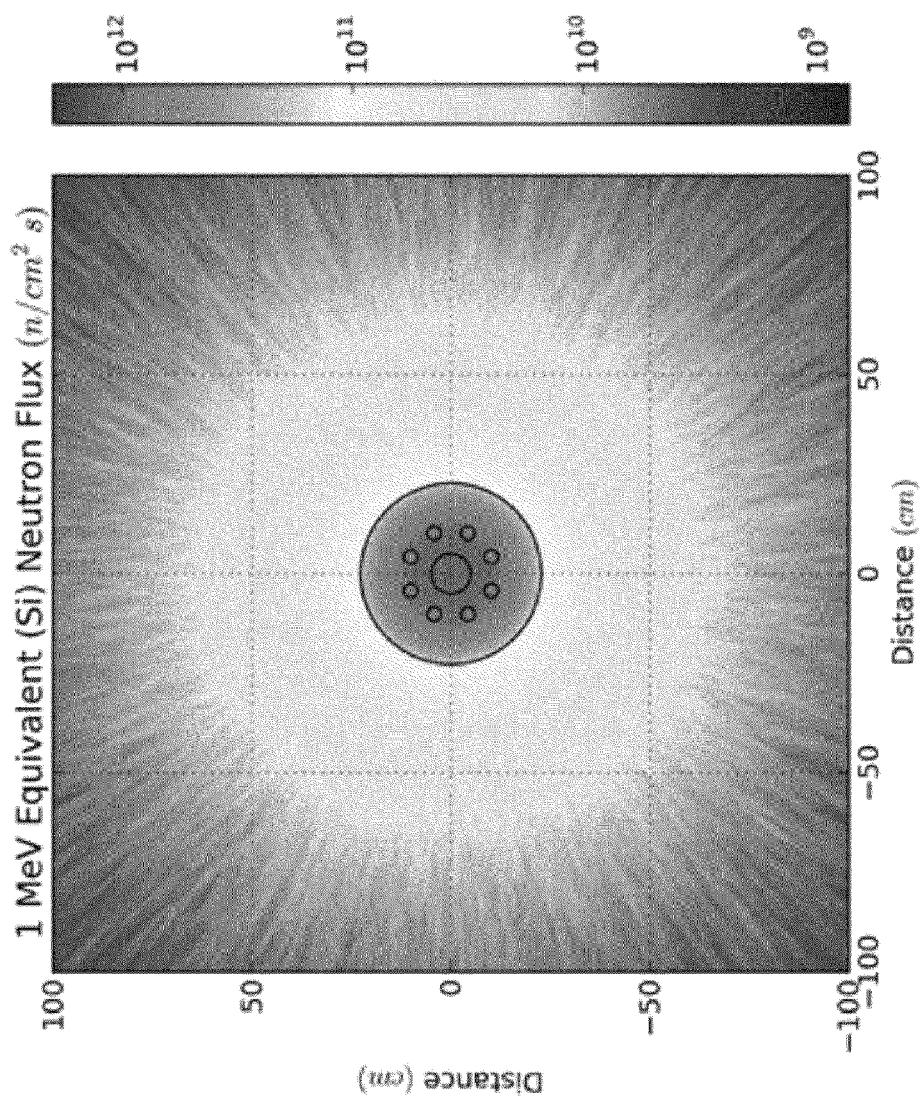
FIG. 27 illustrates a transverse (radial) view of the 1 MeV Si equivalent neutron flux.

Finally, the 1 MeV equivalent neutron flux was mapped to determine where the system would meet a fluence of 1.25e13 n/cm$^2$ over a 12 minute test. This equates to a steady-state flux of 1.74e10 n/cm$^2$-s. In an existing WSMR system, this was at a location of 15" from the center of the current WSMR device, which equates to 11" from the outer surface. Therefore, when testing the system 2000 of the present application, it was preferable to achieve a flux of 1.74e10 n/cm$^2$-s at a location 11" away from the outer surface of the $U_{10}Mo$. The final design has shown a flux of 2.253 n/cm$^2$-s at 11" away from the outer surface of the $U_{10}Mo$, which is 29.5% higher than the current capabilities of the existing WSMR system. The 29.5% flux buffer ensures that if structural or cooling components are added to increase the mobility of the system, the flux will still achieve the desired levels. Another important factor to note is that the actual surface area to which this flux is delivered is three times larger than the existing device at WSMR. This will increase the speed and uniformity at which large objects can be irradiated. Further, the inclusion of water pipes for cooling does not jeopardize the axisymmetric nature of the radial flux profile. FIGS. 26 and 27 display the axial and transverse view of the 1 MeV Si equivalent neutron flux, respectively. Note that the transverse view of the flux was taken at the mid-plane of the device (i.e. z=50 cm).

Criticality Safety

Figure 28:
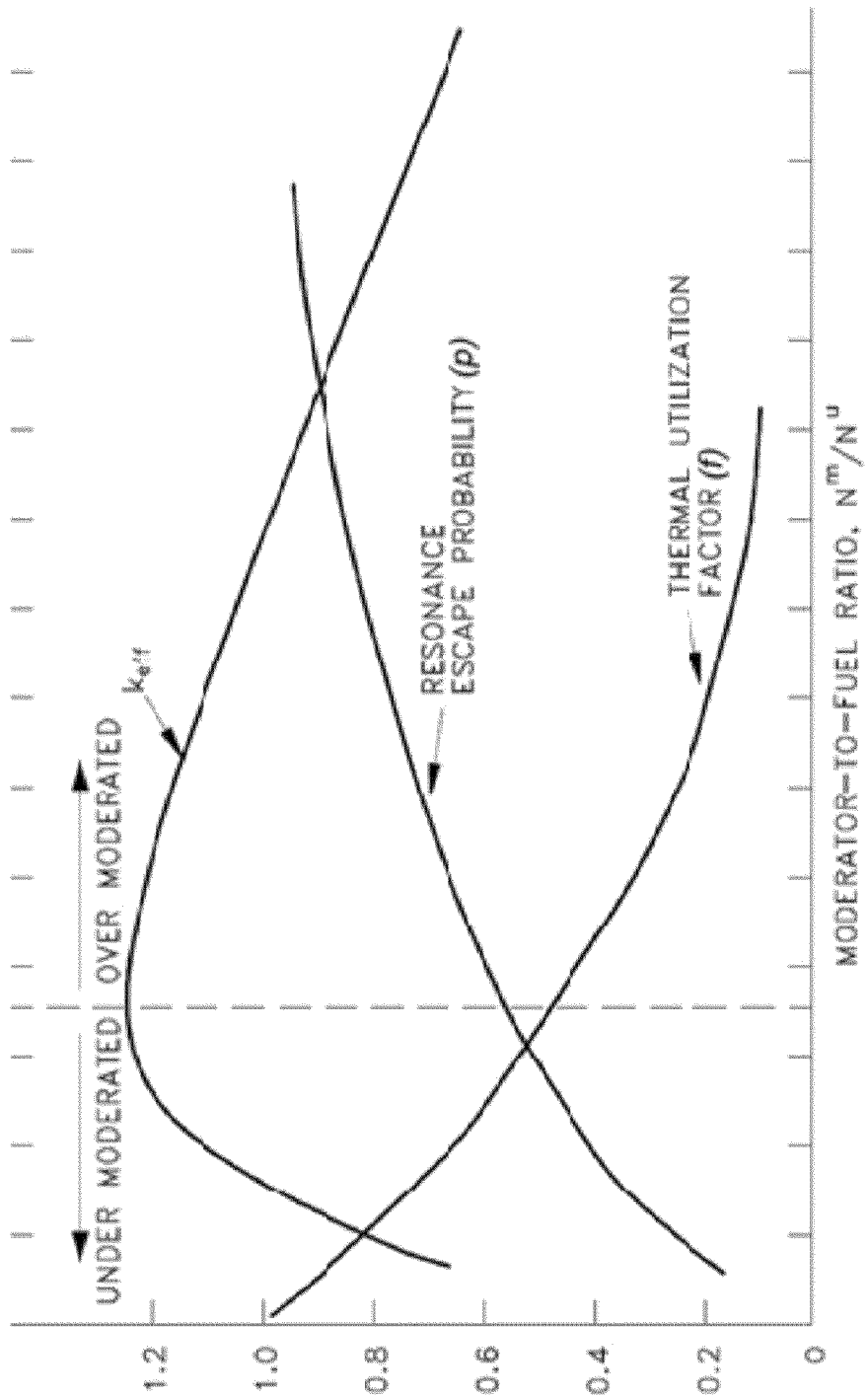
FIG. 28 is a graph illustrating a qualitative effect on $k_{eff}$ with varying moderator-to-fuel ratios.

The two designs under consideration (the DPF device closely coupled with a fission assembly, and the gas-target neutron generator closely coupled with a fission assembly) have been evaluated with respect to criticality safety. In both cases, the systems were designed to maximize 1 MeV equivalent flux. This resulted in the systems having low moderator-to-fuel ratios and harder flux spectrum than is typical in a power reactor. FIG. 28 illustrates this concept with respect to a DPF device closely coupled with a sub-prompt critical fission assembly and a gas-target neutron generator closely coupled with a subcritical fission assembly. In reactors (or subcritical assemblies) with low moderator-to-fuel ratios, the system is under moderated. If additional moderator is added, the $k_{eff}$ of the system will tend to increase. See U.S. Department of Energy. *DOE Fundamentals Handbook: Nuclear Physics and Reactor Theory.* DOE-HDBK-1019/2-93, Washington, D.C. 20585, January 1993, the entire contents of which are incorporated herein by reference.

In order to combat this effect and prevent an inadvertent criticality in the case of flooding or other scenarios that increase the moderator-to-fuel ratio, a layer of cadmium was added to the surface of the fuel. Cadmium has a very high absorption cross section for thermal neutrons, but low cross section for higher energy neutrons. During normal operation when minimal thermal neutrons are in the system, this cadmium has little effect on the flux. However, in a case where the moderator-to-fuel ratio increases (e.g. flooding), the thermal neutron population which would otherwise increase is absorbed by the cadmium. The net result is that the $k_{eff}$ of the system does not increase.

The criticality safety of the two systems was evaluated using MCNP. Because the DPF operates as a 'push-button' source, there is minimal risk of an undesired pulse in that system. However, the LEU multiplier is a fixed system that cannot be turned off. Therefore, the prevention of inadvertent criticality is a point of concern. Two features of the design provide passive control that maintains reactivity within the desired operating range. First, the large thickness of the copper reflector helps to neutronically isolate and decouple the system from the environment. The second and more dominant design element is a 0.5 mm cadmium sheath that surrounds the inner test cavity walls. The cadmium has negligible effects during normal operations because the neutron spectrum is primarily fast. If a strong moderator is introduced to the cavity, such as water during a flood, the spectrum shifts from fast to thermal. Cadmium prevents the more effective thermal neutrons from reaching the fuel. The criticality in such a flooding scenario has been demonstrated to be 0.985 or lower.

Similarly, there exists a 0.1 mm thick layer of cadmium which coats the inside of the DT gas chamber. This is done to ensure that in the event that the DT chamber is flooded the system will not reach criticality. Testing was done in MCNP to verify that in an interior flooding event the criticality of the system drops to 0.965, a value which is safely subcritical. Therefore, the system presents inherent safety in the event of internal flooding.

The system including a DPF closely coupled with a fission assembly, and the system including a gas-target neutron generator closely coupled with a fission assembly provide fast burst and steady-state intense neutron sources that produce very high fluxes of neutrons with compact devices for non-destructive testing.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the fast burst and steady-state intense neutron source shown and/or described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A compact system for producing a high flux of neutrons, the system comprising:
    a dense plasma focus device having an input end and an output end, the dense plasma focus device including
    a cylindrical cathode;
    a cylindrical anode disposed within and concentric to the cathode;
    an insulator provided between portions of the cathode and the anode, the insulator disposed proximate to the input end of the dense plasma focus device; and
    a chamber bounded by the cathode and the anode, the chamber being pressurized with a fill gas;
    an outer multiplier layer configured to cover sidewalls and the input end of the dense plasma focus device;
    a fission assembly neutronically coupled to the dense plasma focus device; and
    a fast neutron multiplier layer configured to cover the output end of the dense plasma focus device,
    wherein the fission assembly is a subcritical or a subprompt critical fission assembly,
    wherein the fission assembly comprises a low enriched uranium blanket, wherein the fast neutron multiplier layer is sandwiched between the output end of the dense plasma focus device and the low enriched uranium blanket, and
    wherein the dense plasma focus device is a source of initiating neutrons for the fission assembly, and the fission assembly is configured to multiply a number of the initiating neutrons via inducing fission.

2. The system of claim 1, wherein the fill gas comprises a deuterium-tritium gas mixture.

3. The system of claim 1, wherein a pressure of the fill gas is static at 1-100 Torr.

4. The system of claim 1, further comprising a supply line configured to introduce puffs of the fill gas at pre-determined time intervals at the input end of the dense plasma focus device,
    wherein a pressure of the fill gas is dynamically raised at a pinch formed at a center of an end of the anode proximate to the output end of the dense plasma focus device.

5. The system of claim 1, wherein the anode has a radius of at least 20 cm and the cathode has a radius of at least 30 cm.

6. The system of claim 1, wherein the dense plasma focus device further comprises a group of capacitor banks constructed in series, and
    wherein each capacitor bank is configured to individually discharge, and individual discharges of each of the capacitor banks are timed such that a specific pulse is formed in order to control a current drive time and a magnitude of current delivered to a pinch formed at a center of an end of the anode proximate to the output end of the dense plasma focus device.

7. The system of claim 1, wherein the outer multiplier layer is comprised of depleted uranium metal.

8. The system of claim 1, wherein the fast neutron multiplier layer is comprised of an aluminum-beryllium alloy.

9. The system of claim 1, wherein the fission assembly further comprises a neutron reflector configured to surround the dense plasma focus device, the outer multiplier layer, the fast neutron multiplier layer and the low enriched uranium blanket.

10. The system of claim 9, wherein the neutron reflector is comprised of copper.

11. The system of claim 1, wherein the low enriched uranium blanket is configured to bound a test cavity.

12. The system of claim 1, wherein the fission assembly is a subcritical fission assembly.

* * * * *

UNITED STATES PATENT AND TRADEMARK OFFICE
CERTIFICATE OF CORRECTION

PATENT NO.        : 10,123,405 B2
APPLICATION NO.   : 15/125855
DATED             : November 6, 2018
INVENTOR(S)       : Ross Radel et al.

Page 1 of 1

It is certified that error appears in the above-identified patent and that said Letters Patent is hereby corrected as shown below:

In the Specification

Please insert the following paragraph at Column 1, beginning on Line 13:
--STATEMENT REGARDING FEDERALLY SPONSORED RESEARCH OR DEVELOPMENT
This invention was made with government support under W9124Q-13-002 awarded by the U.S. Army. The government has certain rights in the invention.--

Signed and Sealed this
Tenth Day of September, 2019

Andrei Iancu
*Director of the United States Patent and Trademark Office*